US011895095B2

(12) United States Patent
D'Agostino et al.

(10) Patent No.: US 11,895,095 B2
(45) Date of Patent: *Feb. 6, 2024

(54) REAL-TIME AUTHENTICATION AND AUTHORIZATION BASED ON DYNAMICALLY GENERATED CRYPTOGRAPHIC DATA

(71) Applicant: THE TORONTO-DOMINION BANK, Toronto (CA)

(72) Inventors: Dino Paul D'Agostino, Richmond Hill (CA); Perry Aaron Jones Haldenby, Toronto (CA); Dean C. N. Tseretopoulos, Toronto (CA); Jeffrey Aaron Ecker, Toronto (CA); Adam Douglas McPhee, Waterloo (CA); Milos Dunjic, Oakville (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 183 days.

This patent is subject to a terminal disclaimer.

(21) Appl. No.: 17/381,807

(22) Filed: Jul. 21, 2021

(65) Prior Publication Data
US 2021/0359981 A1 Nov. 18, 2021

Related U.S. Application Data

(63) Continuation of application No. 15/884,513, filed on Jan. 31, 2018, now Pat. No. 11,102,180.

(51) Int. Cl.
*H04L 9/40* (2022.01)
*G06Q 20/40* (2012.01)

(52) U.S. Cl.
CPC ....... *H04L 63/0428* (2013.01); *G06Q 20/401* (2013.01); *H04L 63/0853* (2013.01)

(58) Field of Classification Search
CPC ............ H04L 63/0428; H04L 63/0853; H04L 63/0807; H04L 63/0861; H04L 63/102;
(Continued)

(56) References Cited

U.S. PATENT DOCUMENTS 5,473,689 A * 12/1995 Eberhard ............. G06Q 20/341
713/172
7,209,970 B1 4/2007 Everson et al.
(Continued)

OTHER PUBLICATIONS

D. Jaros and R. Kuchta, "New Location-Based Authentication Techniques in the Access Management," 2010 6th International Conference on Wireless and Mobile Communications, Valencia, Spain, 2010, pp. 426-430, doi: 10.1109/ICWMC.2010.62. (Year: 2010).*

(Continued)

*Primary Examiner* — Jung W Kim
*Assistant Examiner* — Sameera Wickramasuriya
(74) *Attorney, Agent, or Firm* — Duane Morris LLP

(57) ABSTRACT

The disclosed exemplary embodiments include computer-implemented systems, apparatuses, and processes that, among other things, authenticate device identity and authorize exchanges of data in real-time based on dynamically generated cryptographic data. For example, an apparatus may receive a first signal that includes a first cryptogram associated with a client device, and may perform operations that authenticate an identity of the client device based on a comparison of the received first cryptogram and a second cryptogram generated by a computing system associated with an application program executed by the client device. In response to the authenticated identity, the apparatus may load profile data associated with the client device from a
(Continued)

storage unit, and perform operations consistent with the profile data in accordance with the authenticated identity.

21 Claims, 11 Drawing Sheets

(58) Field of Classification Search
CPC . G06Q 20/401; G06Q 20/38215; G06Q 20/40
See application file for complete search history.

(56) References Cited

U.S. PATENT DOCUMENTS

| | | | |
|---|---|---|---|
| 7,346,923 B2 | 3/2008 | Atkins et al. | |
| 7,628,322 B2* | 12/2009 | Holtmanns | H04L 9/3273 380/247 |
| 9,344,892 B1 | 5/2016 | Rodrigues et al. | |
| 9,363,256 B2 | 6/2016 | Caldwell | |
| 9,374,364 B2 | 6/2016 | Davis et al. | |
| 10,505,738 B1* | 12/2019 | Rule | H04L 9/50 |
| 10,523,708 B1* | 12/2019 | Ilincic | H04L 63/0435 |
| 2002/0174345 A1* | 11/2002 | Patel | H04L 9/3231 713/186 |
| 2007/0198834 A1* | 8/2007 | Ksontini | H04L 63/10 455/411 |
| 2008/0034216 A1 | 2/2008 | Law et al. | |
| 2012/0087493 A1 | 4/2012 | Chidambaram et al. | |
| 2014/0181520 A1* | 6/2014 | Wendling | H04L 63/0869 713/169 |
| 2015/0052350 A1* | 2/2015 | Aumasson | H04L 63/12 713/155 |
| 2015/0334099 A1 | 11/2015 | Zhang et al. | |
| 2016/0092696 A1* | 3/2016 | Guglani | H04W 12/08 726/26 |
| 2016/0219055 A1 | 7/2016 | Hilliar | |
| 2017/0048218 A1* | 2/2017 | Lindemann | H04L 63/0853 |
| 2017/0154333 A1* | 6/2017 | Gleeson | G06Q 20/4012 |
| 2017/0163806 A1 | 6/2017 | Shanmugam et al. | |
| 2017/0255932 A1* | 9/2017 | Aabye | H04L 63/06 |
| 2017/0373852 A1* | 12/2017 | Cassin | G06Q 20/3672 |
| 2018/0006821 A1 | 1/2018 | Kinagi | |
| 2018/0026973 A1* | 1/2018 | Le Saint | H04W 12/069 713/168 |

OTHER PUBLICATIONS

Sweeney, Peter, et al. "Secure Authentication and Document Signature with Cryptogram Smart Card in an Insecure Environment." EGCDMAS. 2004. (Year: 2004).*

Javan et al., "An anonymous mobile payment protocol based on SWPP," Electronic Commerce Research (2014), pp. 635-660.

Abdulganiyu et al., "Avoiding Cybercrime Pandemic in Cashless Society using HMM," International Journal of Computer Applications (2012), pp. 35-43.

Vizzarri, et al., "Security in mobile payments," Congresso Nazionale AEIT (2013) (6 pages).

Alzomai, et al., "Display security for online transactions: SMS-based authentication scheme," 2010 International Conference for Internet Technology and Secured Transactions (2010), pp. 1-7.

* cited by examiner

REAL-TIME AUTHENTICATION AND AUTHORIZATION BASED ON DYNAMICALLY GENERATED CRYPTOGRAPHIC DATA

CROSS-REFERENCE TO RELATED APPLICATION

This application is a continuation of, and claims the benefit of priority to, U.S. application Ser. No. 15/884,513, filed Jan. 31, 2018, the disclosure of which is expressly incorporated herein by reference to its entirety.

TECHNICAL FIELD

The disclosed embodiments relate to computer-implemented systems and processes for real-time authentication and authorization based on dynamically generated cryptographic data.

BACKGROUND

Today, many retailers, financial institutions, utilities, and other businesses operate call centers that receive and respond to inquiries provided by new or existing customers. Agents or employees of these call centers often exchange sensitive and confidential information with the new or existing customers across potentially insecure channels of communication, such as voice communications channels established by wireless or cellular telecommunications networks or by a public switched telephone network (PSTN).

SUMMARY

In some examples, an apparatus may include a communications unit, a storage unit storing instructions, and at least one processor coupled to the communications unit and the storage unit. The at least one processor may be configured to execute the instructions to receive a first signal via the communications unit. The first signal may include a first cryptogram associated with a client device. The at least one processor may be further configured to execute the instructions to load a second cryptogram from the storage unit. The second cryptogram may be generated by a computing system associated with an application program executed by the client device. The at least one processor may be further configured to execute the instructions to authenticate an identity of the client device based on a comparison of the first and second cryptograms, in response to the authenticated identity, load profile data associated with the client device from the storage unit, and perform operations consistent with the profile data in accordance with the authenticated identity.

In other examples, an apparatus may include a communications unit, a storage unit storing instructions, and at least one processor coupled to the communications unit and the storage unit. The at least one processor may be configured to execute the instructions to receive a first signal via the communications unit. The first signal may include a first cryptogram associated with an exchange of data initiated at a client device, and the at least one processor may be further configured to execute the instructions to perform operations that authenticate an identity of the client device based on a comparison of the received first cryptogram and a second cryptogram. The at least one processor may be further configured to execute the instructions to authorize a performance of the initiated data exchange based on the authenticated identity, and generate and transmit, via the communications unit, a second signal to a computing system associated with the initiated data exchange. The second signal may include a confirmation of the authorization of the initiated data exchange.

Further, in some examples, an apparatus may include a communications unit, a storage unit storing instructions, and at least one processor coupled to the communications unit and the storage unit. The at least one processor may be configured to execute the instructions to receive a first signal via the communications unit. The first signal may include a first cryptogram associated with an exchange of data initiated at a client device, and the first cryptogram may be generated by a computing system associated with an application program executed by the client device. The at least one processor may be further configured to execute the instructions to generate and transmit a second signal to the computing system via the communications unit. The second signal may include second information that includes the first cryptogram, the second information may cause the computing system to perform operations that authenticate an identity of the client device based on a comparison between the first cryptogram and a second cryptogram, and that authorize the initiated data exchange based on the authenticated identity. The at least one processor may be further configured to execute the instructions to receive a third signal via the communications module. The third signal may be received from the computing system and may include information that confirms validation of the first cryptogram and the authorization of the initiated data exchange.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

This description of the exemplary embodiments is intended to be read in connection with the accompanying drawings, which are to be considered part of the entire written description. In the description, terms concerning attachments, coupling and the like, such as "connected" and "interconnected," refer to a relationship wherein devices are connected to one another either directly or indirectly through intervening structures, or relationships, unless expressly described otherwise.

I. Exemplary Computing Environments

Figure 1:
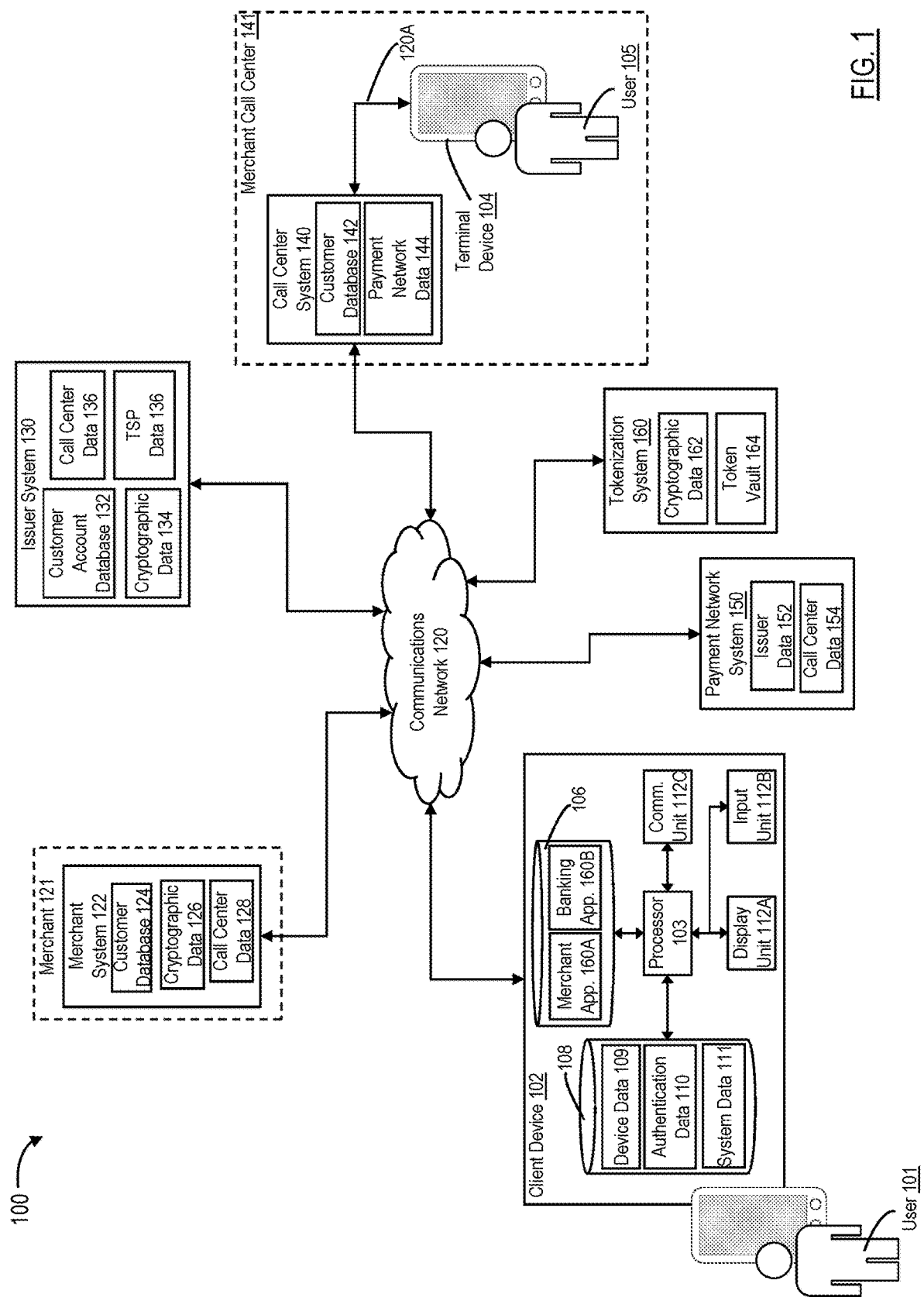
FIG. 1 is a diagram of an exemplary computing environment, consistent with disclosed embodiments.

FIG. 1 is a diagram of an exemplary computing environment 100, consistent with certain disclosed embodiments. As illustrated in FIG. 1, environment 100 may include one or more network-connected devices, such as client device 102, terminal device 104, a merchant system 122, an issuer system 130, a merchant call center system 140, a payment network system 150, and a tokenization system 160, each of which may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, a wide area network (WAN), e.g., the Internet.

In other instances, network 120 may also include one or more telecommunications networks that facilitate voice communication between one or more of the network-connected devices or systems operating within environment 100, such as voice communication between client device 102 and terminal device 104. By way of example, network 120 may include a mobile communications network (e.g., a digital cellular network) operating in accordance with one or more digital cellular technologies, such as, but not limited to, Global System for Mobile Communications (GSM®) technologies, code-division multiple access (CDMA) technologies, General Packet Radio Service (GPRS®) technologies, or Long-Term Evolution technologies (LTE®) technologies. In other examples, network 120 may include, or represent a component of, a public switched telephone network (PSTN). Further, and as illustrated in FIG. 1, call center system 140 and terminal device 104 may also be connected across wired or wireless direct communications channel 120A, which may include a public communications network, such as those described herein, or a private communications network, such as a permissioned intranet.

In an embodiment, client device 102 may include a computing device having one or more tangible, non-transitory memories that store data and/or software instructions, and one or more processors, e.g., processor 103, configured to execute the software instructions. The one or more tangible, non-transitory memories may, in some aspects, store application programs, application modules, and other elements of code executable by the one or more processors, e.g., within executable application data 106. For example, as illustrated in FIG. 1, client device 102 may maintain, within executable application data 106, an executable application associated with or provided by merchant system 122 (e.g., merchant application 106A) and an executable application associated with or provided by a financial institution associated with issuer system 130 (e.g., banking application 106B). The disclosed embodiments are, however, not limited to these exemplary application programs, and in other examples, executable application data 106 may include any additional or alternate store application program, application module, and other elements of code executable by client device 102, such as a web browser that facilitates access to digital portals maintained by network-connected systems operating within environment 100.

Client device 102 may also establish and maintain, within the one or more tangible, non-tangible memories, one or more structured or unstructured data repositories or databases, e.g., data repository 108, that include device data 109, authentication data 110, and system data 111. In one instance, device data 109 may include information that uniquely identifies client device 102, such as a media access control (MAC) address of client device 102 or an IP address assigned to client device 102, and authentication data 110 may include supporting information that enables one or more of the executed application programs, such as merchant application 106A or payment application 106B, to authenticate an identity of a user operating client device 102, such as user 101 of FIG. 1. Examples of this supporting information include, but are not limited to, one or more login credentials assigned to user 101 (e.g., by merchant system 122 or by issuer system 140) or one or more biometric credentials of user 101, such as fingerprint data or a digital image of a portion of user 101's face, or other information facilitating a biometric or multi-factor authentication of user 101. In further instances, system data 111 may include information that uniquely identifies one or more additional network-connected systems operating within environment 100, such as am IP address or a MAC address assigned to merchant system 122 and/or issuer system 130.

Additionally, in some examples, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input unit 112B may include, but is not limited to, a keypad, keyboard, touchscreen, fingerprint scanner, voice activated control technologies, or appropriate type of input unit. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include one or more digital cameras capable of capturing digital images or videos, such as, but not limited to, a front- or rear-facing digital camera. Further, client device 102 may also include a communications unit 112D, such as a wireless transceiver device, coupled to processor 103 and configured by processor 103 to establish and maintain communications with network 120, e.g., via WiFi®, Bluetooth®, NFC, or cellular communications protocols (e.g., LTE®, CDMA®, GSM®, etc.).

In further embodiments, terminal device 104 may include a computing device having one or more tangible, non-transitory memories that store data and/or software instructions, and one or more processors configured to execute the software instructions. Although not illustrated in FIG. 1, client device 102 may include components similar to those described above in reference to client device 102, such as, but not limited to: a display unit coupled to the one or more processors and configured to present interface elements to a corresponding user; an input unit coupled to the one or more processors and configured to receive input data from the corresponding user; and a communications unit coupled to the one or more processors and configured to establish communications with network 120 and additionally or alternatively, with call center system 140 across direct communications channel 120A. Further, the communications unit of client device 102 may also facilitate voice-based communications with client device 102 using any of the exemplary telecommunications protocols described herein.

Examples of client device 102 and terminal device 104 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments.

In some instances, user 101 may operate client device 102 and may do so to cause client device 102 to perform one or more operations consistent with the disclosed embodiments. In further instances, an additional user, such as an employee or agent of a merchant call center or of merchant (e.g., user 105 of FIG. 1), may operate terminal device 104 to perform one or more operations consistent with the disclosed embodiments.

Referring back to FIG. 1, a merchant system 122, issuer system 130, call center system 140, payment network system 150, and tokenization system 160 may each represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary processes described herein.

In other instances, and consistent with the disclosed embodiments, one or more of merchant system 122, issuer system 130, call center system 140, payment network system 150, and tokenization system 160 may correspond to a distributed system that includes computing components distributed across one or more networks, such as network 120, or other networks, such as those provided or maintained by cloud-service providers. Additionally, in some instances, one or more of merchant system 122, issuer system 130, call center system 140, payment network system 150, and tokenization system 160, can be incorporated into a single computing system, or incorporated into multiple computing systems.

By way of example, merchant system 122 may be associated with, or operated by, a physical or electronic merchant, such as merchant 121 of FIG. 1, and user 101 may correspond to a customer that purchases products or services offered for sale by merchant 121. Merchant system 122 may also be associated with, maintain, or provide, one or more application programs operated by network-connected devices operating within environment 100, such as merchant application 106A executed by client device 102. In further instances, merchant system 122 and merchant 121 may also be associated with a merchant call center, such as merchant call center 141 of FIG. 1 (e.g., call center system 140 may perform operations that provide services to customers of merchant 121, such as responding to customer inquiries, initiating payment transactions involving the customers of merchant 121, etc.).

In some examples, described herein, merchant system 122 may receive, from client device 102, data generated by executed merchant application 106A through a corresponding programmatic interface. In response to the received data, merchant system 122 may perform any of the exemplary processes described herein to generate and distribute, in real time, one or more authentication cryptograms that enable call center system 140 to securely authenticate an identity of user 101 without an exchange of sensitive or confidential data across insecure channels of communications.

To facilitate a performance of these exemplary processes, merchant system 122 may maintain, within one or more tangible non-transitory memories, customer database 124, cryptographic data 126, and call center data 128. In some instances, customer database 124 may include structured or unstructured data records that identify and characterize one or more customers of merchant 121, such as user 101, that participate in the exemplary cryptogram-based authentication processes described herein. By way of example, and for user 101, the structured or unstructured data records of customer database 124 may include a unique customer identifier of user 101 (e.g., an login credential assigned to user 101 by merchant system 122, such as an alphanumeric user name), device data that specifies a unique network identifier of a device operated by user 101 (e.g., an IP address, MAC address, or other unique network identifier of client device 102), and/or a unique identifier associated with an application program executed by client device 102 (e.g., an identifier or address of a programmatic interface (such as an API) established by merchant application 106A).

The structured or unstructured data records of customer database 124 may also include customer-specific information that characterizes a relationship between merchant 121 and each of the one or more customers, such as user 101. By way of example, the customer-specific information for user 101 may include, but is not limited to, a name and address of user 101, values of demographic parameters characterizing user 101 (e.g., age, gender, occupation, etc.), information characterizing prior purchase transactions involving merchant 121, or information identifying rewards or loyalty programs in which user 101 participates. Further, customer database 124 may associate or link each portion of the customer-specific information with a corresponding one of the customer identifiers, device data, or application-program identifiers described herein, e.g., to facilitate database query and data extraction operations.

Cryptographic data 126 may include information that supports a generation of one or more unique authentication cryptograms that, when distributed to client device 102 and call center system 140, facilitate a real-time authentication of user 101 by call center system 140. In some instances, the one or more unique authentication cryptograms include, but are not limited to, hash values having a predetermined length or predetermined characteristics, a cryptographic key, a digital token, a random or pseudo-random number, or other type of cryptogram appropriate to client device 102 or call center system 140. Further, the information maintained within cryptographic data 126 may facilitate a generation of the one or more unique authentication cryptograms using any of the exemplary processes described herein, e.g., based on portions of data obtained from client device 102, call center system 140, or from other network-connected devices or systems operating systems operating within environment 100.

Call center data 126 may also include data that uniquely identifies one or more network-connected computing systems maintained by call centers associated with merchant 121, such as call center system 140. For example, call center data 126 may include, but is not limited to, data that specifies an IP address, a MAC address, or other unique network identifier of call center system 140 and/or other call center systems operating within environment 100.

Issuer system 130 may be associated with, or operated by, a financial institution that issues one or more payment instruments to one or more customers of merchant 121 (e.g., a credit card account, debit card account, deposit account, etc., issued by the financial institution and held by user 101). Further, and as described herein, issuer system 130 may also be associated with, maintain, or provide, one or more application programs operated by network-connected devices operating within environment 100, such as banking application 106B executed by client device 102. In some examples, described herein, issuer system 130 may receive, from client device 102, data generated by executed banking application 106B through a corresponding programmatic interface. In response to the received data, issuer system 130 may perform any of the exemplary processes described herein to generate and distribute, in real time, one or more authentication cryptograms that facilitate an authentication of an identity of user 101, and an authorization of certain exchanges of data initiated by user 101 or client device 102, without a transmission of sensitive or confidential data potentially insecure communications channels.

To facilitate a performance of these exemplary processes, issuer system 130 may maintain, within one or more tangible non-transitory memories, customer account database 132, cryptographic data 134, call center data 136, and tokenization service provider (TSP) data 138. By way of example, customer account database 132 may include data records that identify and characterize one or more customers that hold payment instruments issued by issuer system 130, such as user 101. By way of example, and for user 101, the data records of customer accounts database 132 may include a unique customer identifier of user 101 (e.g., an login credential assigned to user 101 by issuer system 130), device data that specifies a unique network identifier of a device operated by user 101 (e.g., an IP address, MAC address, or other unique network identifier of client device 102), and/or a unique identifier associated with an application program executed by client device 102 (e.g., an identifier or address of a programmatic interface (such as an API) established by an executed application program provided or maintained by issuer system 130, such as banking application 106B).

The data records of customer account database 132 may also include account data characterizing each of the payment instruments held by the customers, which may be linked to corresponding ones of the unique customer, device, or application identifiers described above. Examples of the payment instruments include, but are not limited to, a credit card account, a debit card account, a deposit account (e.g., a saving, checking, or sweep account), or a line of credit issued to corresponding ones of the customers by the financial institution associated with issuer system 130. Further, and for a corresponding one of the payment instruments, the account data may include data that identifies the corresponding payment instrument (e.g., tokenized account numbers, expiration dates, and/or card verification values, etc.) and characterizes a current status of the corresponding payment instrument (e.g., a current account balance, an amount of available credit, etc.). In some instances, as described below, issuer system 130 may perform operations that authorize an initiated payment transaction based on portions of the account data.

In further examples, cryptographic data 134 may include information that supports a generation of one or more unique authorization cryptograms that, when distributed to client device 102 or call center system 140, facilitate a real-time authentication of user 101 and authorization of initiated or required data exchanges by issuer system 130. In some instances, and as described herein, the one or more unique authorization cryptograms include, but are not limited to, hash values having a predetermined length or predetermined characteristics, a cryptographic key, a digital token, a random or pseudo-random number, or other type of cryptogram appropriate to client device 102, issuer system 130, and call center system 140. Further, the information maintained within cryptographic data 134 may facilitate a generation of the one or more unique authorization cryptograms by issuer system 130 using any of the exemplary processes described herein, e.g., either alone or in conjunction one or more additional network-connected computing systems, such as tokenization system 160.

Call center data 136 may include data that uniquely identifies one or more network-connected computing systems maintained by merchant call system, such as call center system 140 maintained by merchant call center 141 of FIG. 1. For example, call center data 136 may include, but is not limited to, data that specifies an IP address, a MAC address, or other unique network identifier of call center system 140 and/or other call center systems operating within environment 100. Further, TSP data 138 may identify one or more network-connected computing systems (e.g., such as, but not limited to, tokenization system 160) configured to perform any of the exemplary token generation and/or redemption processes described herein for issuer system 130. For example, TSP data 138 may include, but is not limited to, data that specifies an IP address, a MAC address, or other unique network identifier of tokenization system 160 and/or other tokenization systems operating within environment 100.

In some examples, call center system 140 may be associated with, or operated by merchant call center 141, and may perform any of the exemplary processes described herein to authenticate an identity of a customer of merchant 121, such as user 101, based on a comparison between a received authentication cryptogram (e.g., as provided by client device 102 across an unsecured communications channel) and a provisioned authentication cryptogram (e.g., as generated and distributed by merchant system 122 or by issuer system 130). In response to a successful authentication of user 101's identity, call center system 140 may be configured to access profile data associated with user 101 (e.g., as maintained within one or more tangible, non-transitory memories), and perform operations consistent with the accessed profile data, For example, the performed operations may include, but are not limited to, generating responses to inquiries regarding a relationship between user 101 and merchant 121, a status of one or more purchase transactions involving products or services offered for sale by merchant 121, or a status of a line of credit extended to user 101 by merchant 121.

In other examples, and responsive to the successful authentication of user 101's identity, call center system 140 may perform further operations that initiate an exchange of data with one or more network-connected computing systems operating within environment 100, such as issuer system 130. The initiated exchange of data may, in some instances, facilitate a payment transaction that, upon authorization by issuer system 130, transfers funds from an account associated with payment instrument held by user 101 (e.g., and issued the financial institution associated with issuer system 130) to a corresponding financial services account held by or associated with merchant 121. For example, the initiated payment transaction may satisfy an existing debt or obligation incurred by user 101, such as a payment due on the line of credit extended to user 101 by merchant 121, or may facilitate a purchase of a product or service offered for sale by merchant 121, and the accessed profile data may specify the payment instrument held by user 101 and involved in the initiated payment transaction.

To facilitate a performance of these exemplary processes, call center system 140 may maintain, within the one or more tangible non-transitory memories, customer database 142 and payment network data 146. In some instances, customer database 142 may include data records that identify and characterize one or more customers of merchant 121, such as user 101, and that associate each of the customers with a corresponding authentication cryptogram and further, with corresponding profile data that characterizes each of the customers and their interactions with merchant system 122 and/or call center system 140. By way of example, and for user 101, the data records may include a unique customer identifier of user 101 (e.g., a login credential assigned to user 101 by merchant system 122, a network identifier of a device operated by user 101, such as an IP address or a MAC address of client device 102, etc.), and may associate that unique customer identifier with the corresponding authentication cryptogram and with the corresponding profile data.

As described herein, and for user 101, the corresponding authentication cryptogram may be generated by merchant system 122 or by issuer system 130, e.g., in response to data generated by respective ones of executed merchant application 106A or executed banking application 106B. Further, the corresponding profile data for user 101 (and for the one or more other customers) may include, but is not limited, a name and address of user 101, values of demographic parameters characterizing user 101 (e.g., age, gender, occupation, etc.), rewards or loyalty programs in which user 101 participates, one or more merchant promotions available to user 101, a current status of a line of credit extended to user 101 by merchant 121, and data characterizing one or more payment instruments held by user 101 and specified to fund initiated payment transactions (e.g., tokenized data specifying one or more payment instruments held by user 101). In some examples, payment network data 144 may include information that identifies one or more payment networks capable of clearing and settling payment transactions initiated at call center system 140, such an IP address, MAC address, or other network identifier of payment network system 150.

Payment network system 150 may perform operations that, in conjunction with issuer system 130, authorize initiated payment transactions using one or more exemplary authorization processes, and further, clear and settle authorized payment transactions using one or more exemplary transaction clearance and settlement processes. In certain aspects, and to facilitate a performance of these exemplary authorization, clearance, and/or settlement processes, payment network system 140 may maintain issuer data 152 within the one or more tangible, non-transitory memories. Issuer data 152 may include information that uniquely identifies computer systems maintained by one or more issuers of payment instruments held by customers of merchant 121 (e.g., an IP address, MAC address, or other unique identifier of issuer system 130). Call center data 154 may include data that uniquely identifies computer systems maintained by one or more merchant call centers (e.g., an IP address, MAC address, or other unique identifier of call center system 140).

In some examples, tokenization system 160 may, upon execution of stored software instructions, perform operations that provide tokenization services to issuer system 130, and additionally or alternatively, to payment network system 150. As illustrated in FIG. 1, and to facilitate the performance of these exemplary tokenization processes, tokenization system 160 may maintain, within on or more tangible non-transitory memories, cryptographic data 162 and a token vault 164. Cryptographic data 162 may, in some instances, information that supports a generation and/or a decryption of one or more unique authentication cryptograms that, when distributed to client device 102 and call center system 140, facilitate a real-time authentication of user 101 by call center system 140. In further instances, cryptographic data 162 may also specify one or more private, public, or symmetric cryptographic keys capable of decrypting one or more payment authorization requests generated by call center system 140 (and broadcast to payment network system 150 for authorization by issuer system 130). Additionally, in some instances, token vault 164 may include structured data records that include tokenized data (e.g., a digital token) representative of one or more payment instruments held by user 101 (and users of other client devices and payment devices operating within environment 100), and that associate the tokenized data with account numbers, expiration dates, card verification values, and other sensitive or confidential account data that facilitate an authorization, by issuer system 130, of payment transactions involving these payment instruments.

II. Exemplary Computer-Implemented Processes for Authenticating Network-Connected Devices in Real-Time Using Dynamically Generated Cryptographic Data In some embodiments, call center system 140 and terminal device 104 may perform operations that, individually or collectively, receive and respond to inquiries by provided by one or more customers of merchant 121, such as user 101. By way of example, and in response to input provided by user 101 (e.g., to input unit 112B), client device 102 may perform operations that establish a voice communications session with terminal device 104 using any of the exemplary telecommunications technologies described herein, and user 101 may verbally communicate a merchant-specific inquiry to an employee or agent of merchant call center 141, e.g., user 105, across the established voice communications session. As described herein, the merchant-specific inquiry may include, but is not limited to, an inquiry regarding a relationship between user 101 and merchant 121 (e.g., a status of user 101 within one or more loyalty or rewards programs, etc.), an inquiry regarding a status of one or more purchase transactions involving products or services offered for sale by merchant 121, or an inquiry regarding status of a line of credit extended to user 101 by merchant 121.

As described herein, user 105 may provide data characterizing the merchant-specific inquiry (e.g., as delivered to user 105 across the established voice communications session) as an input to terminal device 104, which may route the input data to call center system 140, e.g., across communications channel 120A. In some examples, the input data may include a unique identifier of user 101, and based on the unique identifier, call center system 140 may perform operations that identify and load, from one or more tangible, non-transitory memories, profile data associated with user 101 (e.g., from customer database 142 of FIG. 1) and that transmit portions of the profile data to terminal device 104 for presentation to user 105 (e.g., via a corresponding display unit). Based on the presented portions of the profile data, user 105 may provide a response to the received merchant-specific inquiry over the established voice communications session, or may provide additional input to terminal device 104 requesting an initiation of additional operations by call center system 140 in accordance with the profile data.

Prior to identifying, loading, or transmitting the profile data associated with user 101, call center system 140 may, in conjunction with terminal device 104, perform additional operations that authenticate an identity of user 101. For instance, to facilitate these additional authentication operations, user 101 may provide, across the established voice communications channel, certain elements of sensitive or confidential information, such as a social security number, a government-issued identification number (e.g., a driver's license number, etc.) or a date of birth, or answers to certain merchant-specific security question, such as a name of user 101's first pet or a name of user 101's primary school. User 105 may provide portions of the elements of sensitive personal information and/or the answers to the merchant-specific security questions as input data to terminal device 104 (e.g., via the corresponding input unit), which may route the input data to call center system 140 for comparison against locally stored authentication data characterizing user 101 (e.g., within customer database 142).

The established voice communications session between client device 102 and terminal device 104 may, in some instances, represent an insecure channel of communications, and certain of these conventional customer authentication processes, which require an exchange of sensitive or confidential information across the insecure communication channel, may exposure user 101, merchant 121, or merchant call center 141 to fraudulent activity by malicious third parties. For example, a malicious third party may access the voice communication session without permission and intercept portions of the sensitive or confidential information or the answers to merchant-specific security questions. In other examples, a malicious third party disposed proximate to user 101 may overhead and obtain portions of the portions of the sensitive or confidential information without permission from user 101, or another employee or agent of merchant call center 141 may improperly access and utilize portions of the sensitive or confidential information for malicious or fraudulent purposes.

In further examples, described below in reference to FIGS. 2A, 2B, and 3, call center system 140 may authenticate an identity of user 101 based on a unique authentication cryptogram generated programmatically by a network-connected system associated with merchant 121, e.g., merchant system 122, in response to data generated by an application program associated with merchant 121 and executed by client device 102, e.g., merchant application 106A of FIG. 1. The generated data may, in some instances, confirm a local authentication of the identity of user 101 by executed merchant application 106A, and merchant system 122 may perform operations that distribute the generated authentication cryptograms to both client device 102 and to call center system 140. Examples of the unique authentication cryptogram include, but are not limited to, hash values having a predetermined length or predetermined characteristics, a cryptographic key, a digital token, or other type of cryptogram appropriate to client device 102 and call center system 140.

User 101 may provide the authentication cryptogram to user 105 via the established voice communications session, and user 105 may in turn provide the authentication cryptogram as an input to terminal device 104 (e.g., via the corresponding input unit), which may route the authentication cryptogram to call center system 140 across communications channel 120A. In some examples, call center system 140 may perform operations that authenticate the identity of user 101 based on a comparison between the received authentication cryptogram and a stored authentication cryptogram provisioned to call center system 140 by merchant system 122 (e.g., as maintained within customer database 142). Certain of these exemplary processes, which enable call center system 140 to authenticate the identity of user 101 based on programmatically generated authentication cryptograms, may be implemented in addition to, or as an alternate to, the conventional authentication processes described above, which require the transmission of sensitive or confidential information across insecure channels of communication. Further, certain of these exemplary processes, which replace the sensitive or confidential information with authentication cryptograms having no relevance of malicious third parties, may also reduce occurrences of fraud and other malicious activity without modifications to an operation of call center system 140.

Figure 2A:
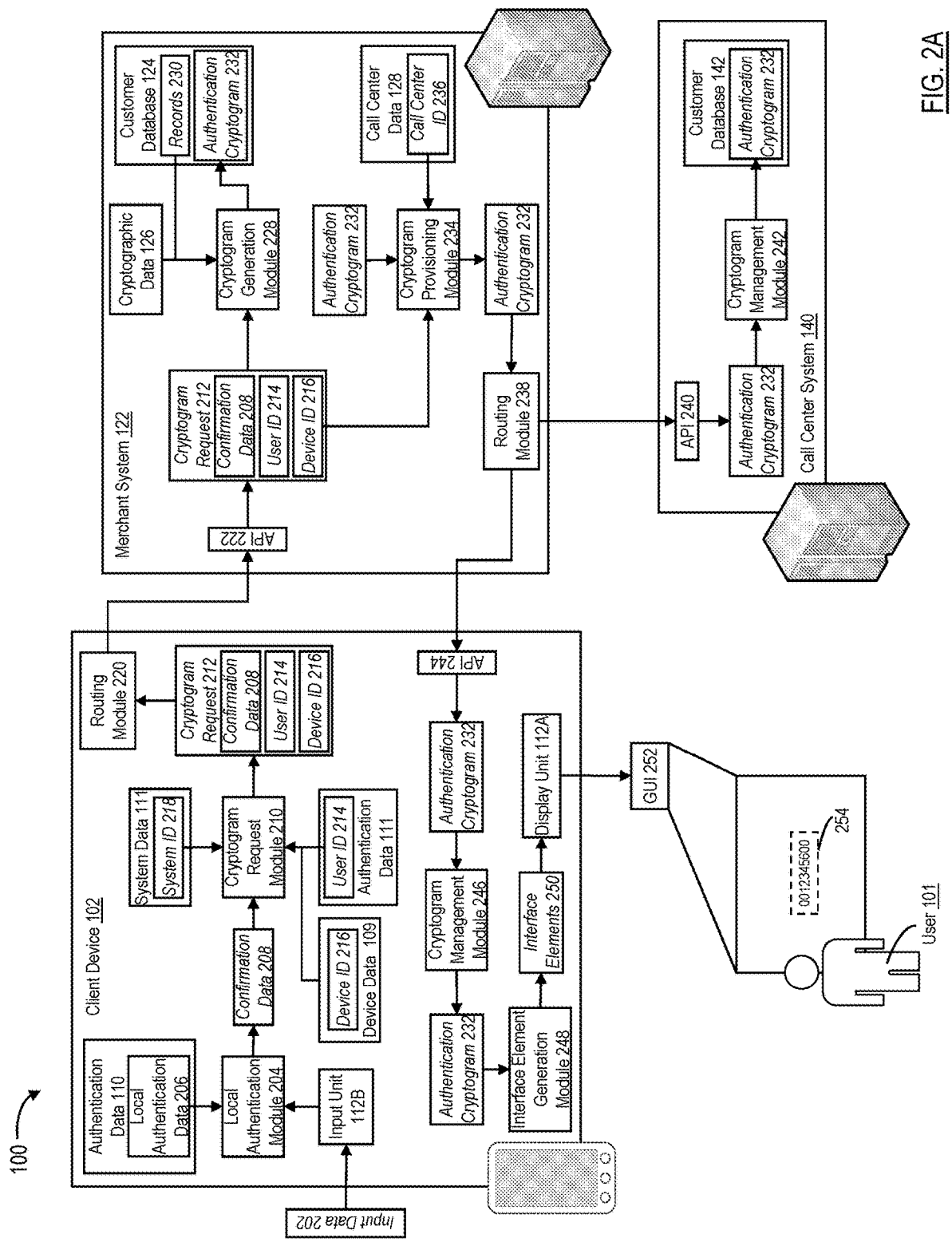
FIGS. 2A and 2B are diagrams illustrating portions of an exemplary computing environment, consistent with disclosed embodiments.

Referring to FIG. 2A, and in response to input provided by user 101 (e.g., via input unit 112B), client device 102 may execute a locally stored application programs associated with or maintained by merchant system 122, e.g., merchant application 106A maintained within application data 106. In some instances, and upon execution of merchant application 106A, client device 102 may generate and render for presentation one or more interface elements, e.g., via display unit 112A, that prompt user 101 to initiate the exemplary authentication processes described herein (e.g., to "request" a generation and distribution of a user-specific authentication cryptogram), and to confirm the request for the user-specific authentication cryptogram by providing one or more authentication credentials as an input to client device 102, e.g., authentication data 202.

Input unit 112B may receive authentication data 202, and may route authentication data 202 to a local authentication module 204 of executed merchant application 106A. By way of example, authentication data 202 may include an alphanumeric user name or password assigned to user 101 by merchant system 122, and additionally, or alternatively, one or more biometric authentication credentials of user 101, such as fingerprint data or a digital image of a portion of user 101's face. The disclosed embodiments are, however, not limited to these examples of authentication credentials, and in further examples, the provided authentication credentials may include any additional or alternate information facilitating a biometric or multi-factor authentication of user 101.

Local authentication module 204 may receive authentication data 202, and may access and load local authentication data 206 from one or more tangible, non-transitory memories, such as authentication data 110 of FIG. 1. Further, in some instances, local authentication module 204 perform operations that authenticate an identity of user 101 based on a comparison between portions of received authentication data 202 and corresponding portions of local authentication data 206. For example, local authentication module 204 may determine that the portions of received authentication data 202 fails to match the corresponding portions of local authentication data 206 (e.g., that user-provided fingerprint data included within received authentication data 202 fails to match, or is insufficiently similar to, local fingerprint data included within local authentication data 206). In response to this determination, local authentication module 204 may elect not to authenticate the identity of user 101, and client device 102 may perform operations that generate and present interface elements, e.g., via display unit 112A, that prompt user 101 to provide additional or alternate authentication credentials as an input to client device 102.

Alternatively, local authentication module 204 may establish that the portions of received authentication data 202 correspond to, or match, local authentication data 206, e.g., that the user-provided fingerprint data matches, or is sufficiently similar to, the local fingerprint data. Based on the established correspondence, local authentication module 204 may authenticate the identity of user 101, and generate confirmation data 208 that confirms the successful authentication of the identify of user 101. Local authentication module 204 provide confirmation data 208 to a cryptogram request module 210 of executed merchant application 106A, which may perform operations that request, from a computing system associated with merchant application 106A (e.g., merchant system 122), a generation and distribution of an authentication cryptogram that confirms the successful local authentication of user 101's identity by executed merchant application 106A and that facilitates a further authentication of user 101's identity by other computing systems operating within environment 100, such as call center system 140 without an exchange of sensitive personal information across an insecure channel of communications.

For example, cryptogram request module 210 may receive confirmation data 208, which confirms the successful local authentication of the identity of user 101, and may package all or a portion of confirmation data 208 into a cryptogram request 212, along with additional information that uniquely identifies user 101 (e.g., user identifier 214, as maintained within local authentication data 206) or client device 102 (e.g., device identifier 216, as maintained within device data 109). In some instances, user identifier 214 may include a unique, alphanumeric identifier assigned to user 101 by merchant system 122 (e.g., a login credential that enables user 101 to access a digital portal associated with merchant system 122), device identifier 216 may include a network address, such as an IP address or a MAC address, that uniquely identifies client device 102 within environment 100. Cryptogram request module 210 may also load, from system data 109, a unique identifier 218 of the computing system associate with executed merchant application 106A, such as a network address (e.g., an IP address or a MAC address) that uniquely identifies merchant system 122 within environment 100.

Cryptogram request module 210 may provide system identifier 218 and cryptogram request 212 as inputs to a routing module 220 of client device 102. In one example, system identifier 218 may be incorporated into a portion of cryptogram request 212, e.g., a header portion, although in other examples, system identifier 218 and cryptogram request 212 may be separate and distinct elements of data. Routing module 220 may receive system identifier 218 and cryptogram request 212 (e.g., as a single data element or as separate data elements). Based on system identifier 218, routing module 220 may perform operations that transmit cryptogram request 212 across network 120 to the network address of merchant system 122 using any of the communication protocols described herein. In some examples, cryptogram request 212 may include information that instructs merchant system 122 to perform any of the exemplary processes described herein to generate an authentication cryptogram indicative of the successful local authentication of user 101's identity by executed merchant application 106A, and to distribute the authentication cryptogram to client device 102 and to one or more additional computing devices or systems operating within environment system 130, such as call center system 140.

Referring back to FIG. 2A, a programmatic interface established and maintained by merchant system 122, such as application programming interface (API) 222, may receive cryptogram request 212 from client device 102. By way of example, API 222 may be associated with, and established and maintained by a cryptogram generation module 228 of merchant system 122, and may facilitate direct, module-to-module communications between routing module 220 of client device 102 and cryptogram generation module 228. API 222 may provide cryptogram request 212 as an input to cryptogram generation module 228, which may store cryptogram request 212 (e.g., including confirmation data 208, user identifier 214, and/or device identifier 216) within one or more tangible, non-transitory memories.

Cryptogram generation module 228 may also access customer database 124, and extract one or more customer data records 230 that include or reference user identifier 214 or device identifier 216. Examples of customer data records 230 include, but are not limited to, a name or address of user 101, information identifying one or more demographic characteristics of user 101 (e.g., an age, a gender, an educational level, etc., of user 101), or information characterizing a functionality of device 102 (e.g., a display functionality, etc.). The disclosed embodiments are, however, not limited to these examples of input data, and in other examples, input data 226 may include any additional or alternate information that characterizes user 101 or client device 102, and that would be appropriate to merchant 121 or merchant system 122.

In some examples, cryptogram generation module 228 may perform operations that generate an authentication cryptogram 232 indicative of the local authentication of the identity of user 101 (e.g., by executed merchant application 106A, as described herein) based on portions of cryptogram request 212 and/or received customer data records 230. By way of example, authentication cryptogram 232 may include a string of alphanumeric characters having a predetermined length (e.g., ten characters, fifteen characters, etc.), a predetermined composition (e.g., numerals from zero to nine, etc.), or a predetermined structure (e.g., a specified number of leading or training zeros, etc.), and may possess no extrinsic or exploitable value to malicious third parties operating within environment 100. As such, authentication cryptogram 232, and its underlying alphanumeric character string, may be freely exchanged between network-connected devices and systems with minimal risk of exploitation by these malicious third parties, e.g., between client device 102 and call center system 140 or terminal device 104 across an insecure voice communications channel.

In some instances, cryptogram generation module 228 may generate authentication cryptogram 232 in accordance with certain elements of cryptographic information maintained locally by merchant system 122 within one or more tangible, non-transitory memories, e.g., cryptographic data 126 of FIG. 1. For example, cryptographic data 126 may specify the particular length, composition, or structure of the alphanumeric character string included within authentication cryptogram 232 and further, may specify a particular cryptogram-generation function, algorithm, or scheme that, when applied to the portions of cryptogram request 212 and/or customer data records 230 by cryptogram generation module 228, generate authentication cryptogram 232 in accordance with the predetermined length, composition, or structure. In other examples, cryptographic data 126 may specify that cryptogram generation module 228 should apply the particular cryptogram-generation function, algorithm, or scheme to a specified portion of cryptogram request 212, such as user identifier 214, device identifier 216, elements of confirmation data 208, and additionally or alternatively, to a specified portion of customer data records 230, such as a name of user 101, an address of user 101, or another element of customer-specific information.

Further, in some examples, cryptographic data 126 may specify multiple cryptogram-generation functions, algorithms, or schemes, and may include information that enables a selection of a corresponding one of these functional, algorithms, or schemes by cryptogram generation module 228, e.g., based on portions of input data 230. For instance, cryptographic data 126 may associate certain cryptogram-generation functions, algorithms, or schemes, or certain cryptogram lengths, compositions, or structures, with corresponding user characteristics (e.g., demographic characteristics, such as age, etc.), device characteristics or capabilities (e.g., display functionality of client device 102, etc.), or application-specific characteristics (e.g., security requirements of merchant application 106A). The disclosed embodiments are, however, not limited to these exemplary elements of cryptographic data 126, and in other instances, cryptographic data 126 may include any additional or alternate information that supports the generation or provisioning of authentication cryptogram 232, including one or more previously generated authentication cryptograms.

In one instance, authentication cryptogram 232 may include a hash value, which cryptogram generation module 228 may generate through an application of a corresponding hash function to selected portions of cryptogram request 212 and/or customer data records 230. Examples of the corresponding hash value include, but are not limited to, an MD5 hash function, an SHA-1 or an SHA-2 hash function, or another cryptographic hash function capable of generating the alphanumeric character string having the predetermined length, composition, or structure. Further, the selected portion of input data 226 may include, but is not limited to, user identifier 214, device identifier 216, a portion of confirmation data 208 (e.g., specifying a time or date of cryptogram request 212), a portion of the customer-specific information included within customer data records 230, such as a name or address of user 101), or combinations thereof.

Authentication cryptogram 232 may also include a tokenized representation of selected portions of cryptogram request 212 and/or customer data records 230. For example, and based on a corresponding tokenization scheme (e.g., as maintained within cryptographic data 126 of FIG. 1), cryptogram generation module 228 may generate authentication cryptogram 232 by replacing sensitive or personal information within the selected portion of input data with corresponding information having no exploitable or extrinsic meaning, e.g., a digital token. As described herein the "tokenized" portion of cryptogram request 212 and/or customer data records 230 may include, among other things, user identifier 214, device identifier 216, a portion of confirmation data 208, a portion of the customer-specific information characterizing user 101, and may be specified by the corresponding tokenization scheme or identified within a portion of cryptographic data 126.

In other instances, authentication cryptogram 232 may include a cryptographic key generated in accordance with a corresponding key-generation algorithm, or a random or pseudo-random string of alphanumeric characters generated in accordance with respective ones of a random number generation algorithm or a pseudo-random number generation algorithm. For example, cryptogram generation module 228 may generate authentication cryptogram 232 through an application of the corresponding key-generation algorithm, the random number generation algorithm, and/or the pseudo-random number generation algorithm to a selected portion of input data 226, e.g., a portion of cryptogram request 212 and/or customer data records 230. Further, cryptographic data 126 may include information that not only specifies the corresponding key-generation algorithm, the random number generation algorithm, and/or the pseudo-random number generation algorithm, but also the selected portion of input data 226, e.g., any of the portions of cryptogram request 212 or customer data records 230 described herein.

Further, in some instances, authentication cryptogram 232, as generated by cryptogram generation module 228, may be valid for a single authentication operation (e.g., the authentication of the identify of user 101 by call center system 140 based on data transmitted from client device 102), or may be valid for one or more authentication operations initiated during a corresponding temporal period of validity, such as, but not limited to, five, ten, or fifteen minutes after generation by cryptogram generation module 228. In other instances, and consistent with certain of the disclosed exemplary embodiments, cryptogram generation module 228 may impose no temporal limitations on newly generated authentication cryptogram 232, and authentication cryptogram 232 may be valid for and may facilitate authentication operation indefinitely upon generation and provisioning to network-connected devices and systems operating within environment 100.

Referring back to FIG. 2A, cryptogram generation module 228 may perform operations that store authentication cryptogram 232 within a portion of customer database 124 associated with user 101, e.g., within a portion of customer data records 230, and associate authentication cryptogram 232 with user identifier 214 and/or device identifier 216 within the structured or unstructured data records. Cryptogram generation module 228 may also provide authentication cryptogram 232 as an input to a cryptogram provisioning module 234, which may perform operations that provision authentication cryptogram 232 to client device 102 and to call center system 140 (and to other network-connected devices and systems operating within environment 100, such as issuer system 130).

For example, and upon receipt of authentication cryptogram 232, cryptogram provisioning module 234 may access call center data 128 (e.g., as maintained by merchant system 122 within one or more tangible, non-transitory memories) and load call center identifier 236, which includes a unique network address of call center system 140 within environment 100 (such as, but not limited to, an IP address or a MAC address assigned to call center system 140). Cryptogram provisioning module 234 may also access and load device identifier 216 from the one or more tangible, non-transitory memories (e.g., from locally stored cryptogram request 212, or from a portion of customer database 124). As described herein, device identifier 216 may include a unique network address of client device 102 within environment 100, such as an assigned IP or MAC address. Cryptogram provisioning module 234 may provide authentication cryptogram 232, call center identifier 236, and device identifier 216 as inputs to a routing module 238 of merchant system 122, and routing module 238 may perform operations that causer merchant system 122 to transmit authentication cryptogram 232 across network 120 to the network address of client device 102 (e.g., as specified by device identifier 216) and to the network address of call center system 140 (e.g., as specified by call-center identifier 236).

A programmatic interface established and maintained by call center system 140, such as application programming interface (API) 240, may receive authentication cryptogram 232 from merchant system 122. By way of example, API 240 may be associated with, and established and maintained by a cryptogram management module 242 of call center system 140, and may facilitate direct, module-to-module communications between routing module 238 of merchant system 122 and cryptogram management module 242. API 240 may route authentication cryptogram 232 to cryptogram management module 242, which may perform operations that store authentication cryptogram 232 within one or more tangible non-transitory memories, such as within a portion of customer database 142. Further, in some instances, cryptogram management module 242 may also perform operations that associate or otherwise link stored authentication cryptogram 232 within information within customer database 142 that identifies uniquely user 101 or device 102, such as the exemplary user or device identifiers described herein.

Further, a programmatic interface established and maintained by client device 102, such as application programming interface (API) 244, may receive authentication cryptogram 232 from merchant system 122. API 244 may, for example, be associated with a cryptogram management module 246 of client device 102, and cryptogram management module 246 may perform operation that store authentication cryptogram within one or more tangible, non-transitory memories, such as within a portion of authentication data 110. Cryptogram management module 246 may also provide authentication cryptogram 232 as an input to interface element generation module 248, which may generate one or more interface elements 250 representative of authentication cryptogram 232 and provide interface elements 250 to display unit 112A. In some examples, display unit 112A may render interface elements 250 for presentation to user 101 within a corresponding interface, such as graphical user interface (GUI) 252 generated by executed merchant application 106A. In other examples, not illustrated in FIG. 2A, client device 102 may perform operations that generate an audible representation of authentication cryptogram 232 (e.g., based on an application of one or more text-to-speech (TTS) algorithms to the alphanumeric character string included within authentication cryptogram 232), and present that generated audible representation to user 101 through a corresponding hardware component, such as an embedded speaker or through headphones in communication with client device 102 through a wired or wireless connection.

For example, as illustrated in FIG. 2A, authentication cryptogram 232 may include an alphanumeric character string 254, e.g., "0012345600," which display unit 112A may display within GUI 252. As described herein, alphanumeric character string 254 may be characterized by a predetermined length (e.g., ten digits) and/or a predetermined composition (e.g., all numbers), and may exhibit a predetermined structure (e.g., two leading and trailing zeros). Further, one or more of the predetermined length, composition or structure may be tailored to the presentation functionalities of client device 102 (e.g., a display functionality, such as a size or resolution of display unit 112) and additionally or alternatively, may be established to facilitate a reliable and consistent verbal transmission of authentication cryptogram 232 across the established voice communication channel (e.g., merchant system 122 may establish the predetermined length of alphanumeric character string 254 to enable verbal transmission across the established voice communication channel within a reasonable amount of time).

As described herein, and responsive to input provided to client device 102 by user 101 (e.g., via input unit 112B), client device 102 may perform operations that establish and maintain a voice communications channel between client device 102 and terminal device 104, e.g., using any of appropriate telecommunications protocols. For example, terminal device 104 may be operated by an agent or employee of call center 141 (e.g., user 105 of FIG. 1), and user 101 may verbally communicate a merchant-specific inquiry to user 105 across the established voice communications session. The merchant-specific inquiry may include, but is not limited to, an inquiry regarding a relationship between user 101 and merchant 121 (e.g., a status of user 101 within one or more loyalty or rewards programs, etc.), in inquiry regarding a status of one or more purchase transactions involving products or services offered for sale by merchant 121, or an inquiry regarding status of a line of credit extended to user 101 by merchant 121.

In some instances, and to facilitate a resolution of the merchant-specific inquiry, call center system 140 may provision terminal device with information, such as customer profile data, that characterizes the relationship between user 101 and merchant 121. Prior to provisioning the customer profile data to terminal device 104, call center system 140 may perform additional operations that authenticate an identity of user 101, e.g., based on information transmitted to terminal device 104 by client device 102 across the established voice communications session, and subsequently related to call center system 140 by terminal device 104. In one example, user 101 may recite alphanumeric character string 254 (e.g., the string "0012345600" presented on GUI 252), and a microphone embedded in or in communication with client device 102 (e.g., a portion of input unit 112B) may capture audio content representative of recited alphanumeric character string 254. In other examples, an application program executed by client device 102 (e.g., merchant application 106A) may generate the audio content representative of recited alphanumeric character string 254 automatically and without input from user 101, e.g., based on an application of one or more text-to-speech (TTS) algorithms to alphanumeric character string 254.

Client device 102 may transmit a signal that includes the captured or generated audio content across the established voice communications session to terminal device 104 using any appropriate telecommunications protocol, and terminal device 104 may receive, process, and present the captured audio content to user 105, e.g., via an embedded speaker or connected headphones. In some instances, user 105 may provide input data representative of the presented audio content (e.g., user 101's recitation of "0012345600") to terminal device 104 via a corresponding input unit. In other instances, one or more application programs executed by terminal device 104 may perform operations that detect a receipt of the captured or generated audio content, and that process the captured or generated audio content to generate the input data, e.g., automatically and without intervention from user 105 or other employees of call center 141. By way of example, the one or more executed application programs may, collectively or individually, establish a virtual call-center agent or "bot" capable of interacting with user 101 across the established voice communications network.

The disclosed embodiments are, however, not limited to processes that capture or generate audio content representative of a recitation of alphanumeric character string 254 by user 101. In other examples, an application program executed by client device 102, e.g., executed merchant application 106A, may generate a signal representative of an entry of alphanumeric character string 254 into a telecommunications interface of client device 102, such as a Touch-Tone™ interface presented via display unit 112A, and transmit that generated signal across the established voice communications channel to terminal device 104. Client device 102 may generate the signal automatically and without intervention from user 101 (e.g., responsive to a receipt of authentication cryptogram 232), and one or more application programs executed by terminal device 104 may process the received signal and generate input data corresponding to alphanumeric character string 254 (and to authentication cryptogram 232).

In some examples, terminal device 104 may store the received or generated input data (e.g., which represents alphanumeric character string 254 and as such, authentication cryptogram 232) within one or more tangible, non-transitory memories, and transmit the received or generated input data to call center system 140 using an appropriate communications protocol, e.g., across direct communications channel 120A. As described below in reference to FIG. 2B, call center system 140 may perform operations that authenticate an identity of user 101 based on the received or generated input data, and that in response to a successful authentication, provision terminal device 104 with customer profile data that characterizes a relationship between user 101 and merchant 121.

Figure 2B:
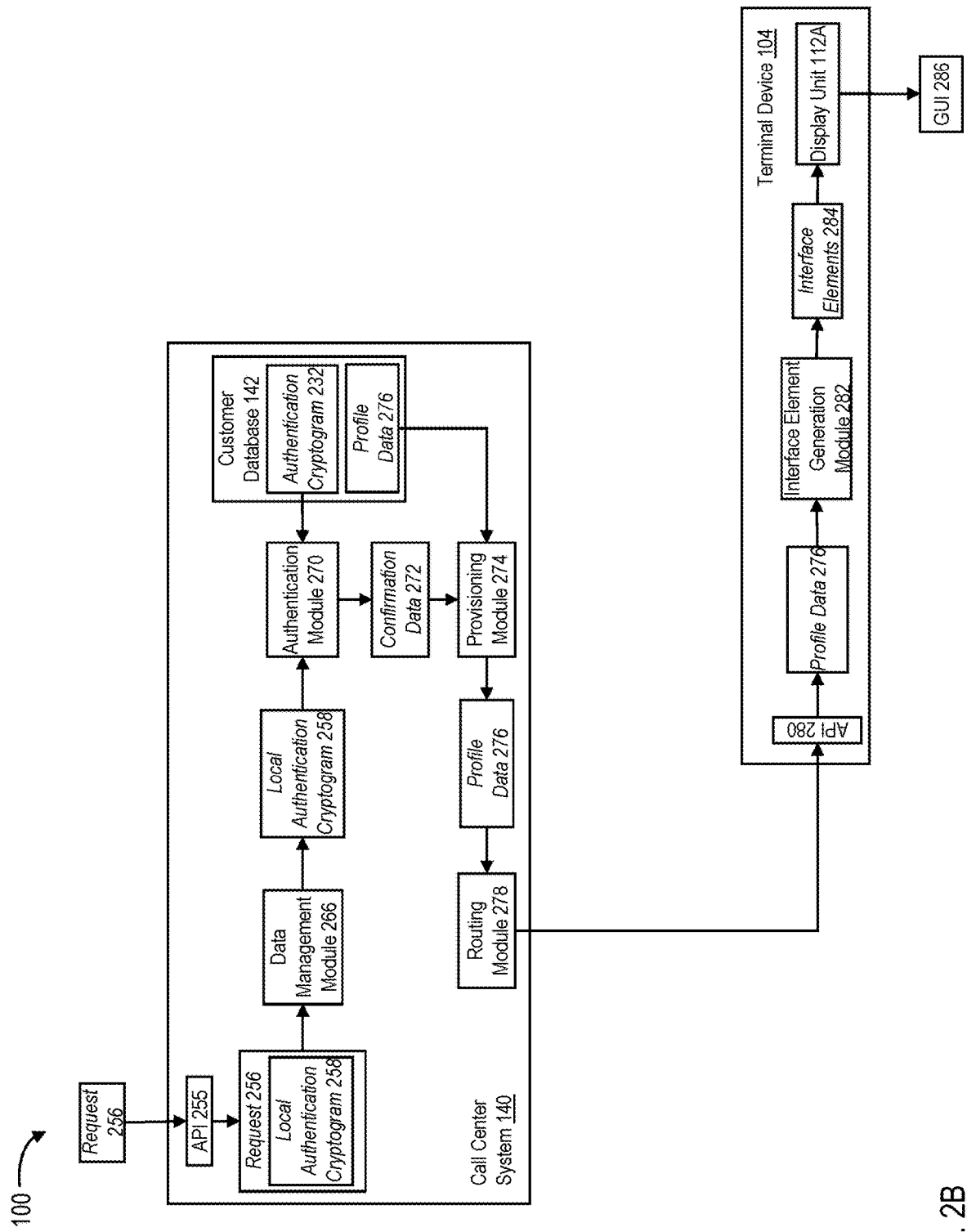

Referring to FIG. 2B, a programmatic interface of call center system 140, e.g., application programming interface (API) 255, may receive a request 256 for customer profile data from terminal device 104, e.g., across direct communications channel 120A. Request 256 may include a local authentication cryptogram 258, e.g., as provisioned to client device 102 by merchant system 122, and may include a corresponding alphanumeric character string. Further, and as described herein, portions of local authentication cryptogram 258, including the corresponding alphanumeric character string, may be received by an agent or employee of merchant call center 141, e.g., user 105, across an established voice communication channel from client device 102, and terminal device 104 may generate request 256 based on input provided by user 105, e.g., via a corresponding input device, such as a keyboard or a pressure-sensitive touchscreen display. In other instances, one or more application programs executed by terminal device 104 may generate all or a portion of request 256 based on signals received across the established voice communications channel (e.g., through an application of one or more text-to-speech (TTS) algorithms to audio content captured or generated by client device 102).

In some instances, API 255 may be associated with, and established and maintained by, a data management module 266 of call center system 140, and may facilitate direct, module-to-module communications between an application program executed by terminal device 104 and data management module 266. API 255 may route request 256 to data management module 266, which may perform operations that store request 256 within one or more tangible, non-transitory memories. Further, data management module 266 may also parse request 256 to extract local authentication cryptogram 258, and to provide local authentication cryptogram 258 as an input to an authentication module 270 of call center system 140.

In some examples, authentication module 270 may receive local authentication cryptogram 258, and may perform operations that access and load a stored authentication cryptogram (e.g., authentication cryptogram 232 provisioned by merchant system 122) from one or more tangible, non-transitory memories, e.g., from within a portion of customer database 142. Authentication module 270 may perform operations that authenticate an identity of user 101 based on a comparison between authentication cryptogram 232 and local authentication cryptogram 258, e.g., as provided by client device 102 and extracted from request 256.

In one example, if authentication module 270 fails to establish a correspondence between authentication cryptogram 232 and local authentication cryptogram 258, authentication module 270 may decline to authenticate the identity of user 101. Authentication module 270 may generate an error message indicative of the unsuccessful authentication, which call center system 140 may transmit to terminal device 104 using any of the processes described herein (not illustrated in FIG. 2B).

In other examples, authentication module 270 may determine that authentication cryptogram 232 corresponds to local authentication cryptogram 258, and authentication module 270 may elect to authenticate the identity of user 101 based on the determined correspondence. Authentication module 270 may generate confirmation data 272 indicative of the successful authentication of the identity of user 101, and may provide confirmation data 272 as an input to a provisioning module 274 of call center system 140. In some instances, confirmation data 272 may also include a unique identifier of user 101 (e.g., an alphanumeric user name or login credential assigned to user 101) or a unique identifier of client device 102 (e.g., an IP address or a MAC address), which may be linked to locally maintained authentication cryptogram 232 within customer database 142.

In response to the receipt of confirmation data 272, which confirms the successful authentication the identity of user 101, provisioning module 274 may access the structured or unstructured data records of customer database 142, and extract profile data 276 that characterizes the relationship between user 101 and merchant 121 (e.g., which may be linked within customer database 142 to the unique user or device identifiers described herein). For example, profile data 276 may include, but is not limited, a name and address of user 101, values of demographic parameters characterizing user 101 (e.g., age, gender, occupation, etc.), rewards or loyalty programs in which user 101 participates, one or more merchant promotions available to user 101, a current status of a line of credit extended to user 101 by merchant 121, and data characterizing one or more payment instruments held by user 101 and specified to fund initiated payment transactions (e.g., tokenized data specifying one or more payment instruments held by user 101). Provisioning module 274 may provide profile data 276 as an input to a routing module 278 of call center system 140, which may access a unique network address of terminal device 104 (e.g., as maintained within one or more tangible, non-transitory memories), and perform operations that cause call center system 140 to transmit profile data 276 to the unique network address of terminal device 104 using any appropriate communications protocols, e.g., across direct communications channel 120A.

A programmatic interface established and maintained by terminal device 104, such as application programming interface (API) 280, may receive profile data 276 from call center system 140, and route profile data 276 to an interface element generation module 282 of terminal device 104. API 280 may, for example, be associated with interface element generation module 282, and may facilitate secure, module-to-module communications between routing module 278 of call center system 140 and interface element generation module 282. In some examples, interface element generation module 282 may generate one or more interface elements 284 representative of portion of profile data 276 and provide interface elements 284 to a display unit, which may render interface elements 284 for presentation to user 105 within a corresponding interface, such as graphical user interface (GUI) 286. Based on the presented portions of profile data 276, user 105 may provide a response to the received merchant-specific inquiry over the established voice communications session, or may provide additional input to terminal device 104 requesting an initiation of additional operations by call center system 140 in accordance with profile data 276.

Figure 3:
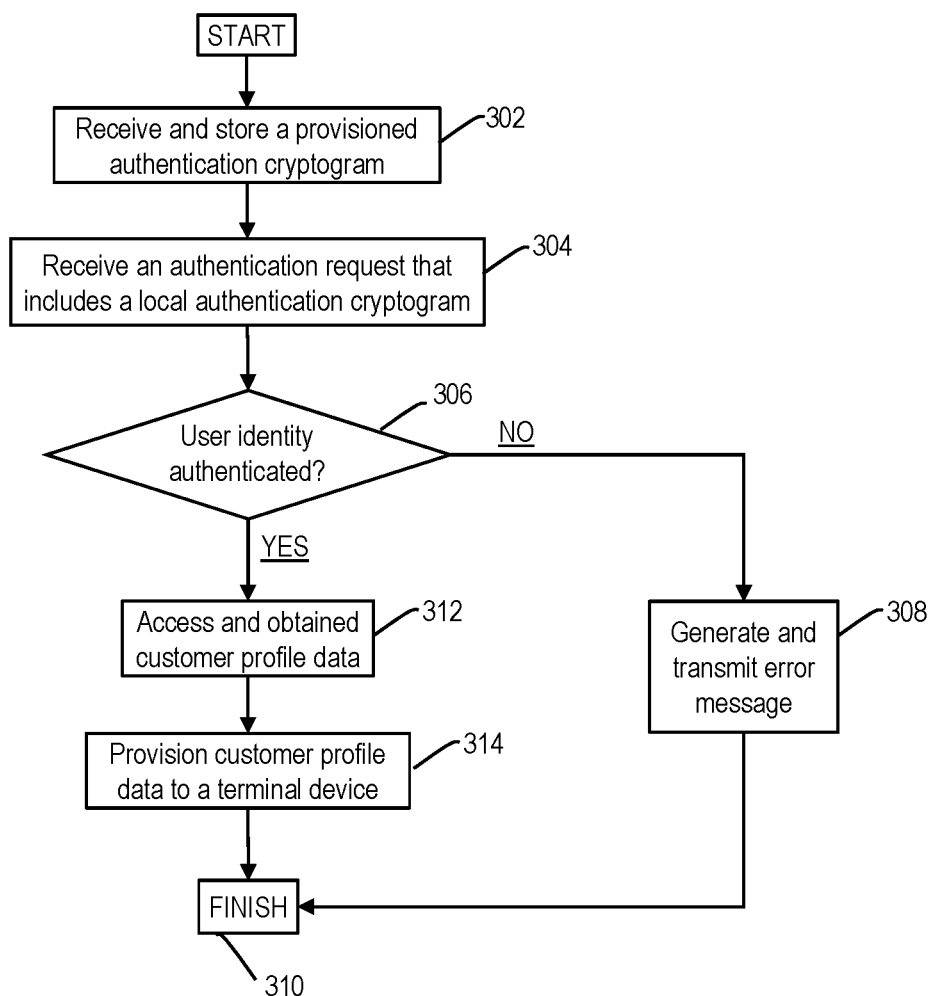
FIG. 3 is a flowchart of exemplary processes for dynamically generating and provisioning an authentication cryptogram to network-connected devices and systems, in accordance with disclosed embodiments.

FIG. 3 is a flowchart of an exemplary process 300 for dynamically generating and provisioning an authentication cryptogram in response to programmatically generated request data, in accordance with certain disclosed embodiments. In some examples, merchant system 122 may perform the steps of exemplary process 300, which includes receiving a request to generate the authentication cryptogram from a network-connected device associated with the initiated data exchange, performing operations that generate the authentication cryptogram and associate the authentication cryptogram with parameter values and other data that characterizes the initiated data exchange, and provisioning the generated authentication cryptogram to the network-connected device. Further, and as described herein, the initiated data exchange may correspond to a payment transaction requested by an operator of the network-connected device (e.g., user 101, who operated client device 102) from network-connected call center system associated with a merchant (e.g., call center system 140 associated with merchant call center 141), and user 101 may provide information requesting and characterizing the payment transaction to an employee or agent call center 141 (e.g., user 105, who operates terminal device 104), across an insecure channel of communication.

Referring to FIG. 3, call center system 140 may receive and store an authentication cryptogram within one or more tangible, non-transitory, such as within a portion of customer database 142 (e.g., in step 302). In on example, merchant system 122 may perform any of the exemplary processes that generate and provision the authentication cryptogram to call center system 140 and further, to client device 102, based on data generated programmatically by an application program executed by client device 102, such as merchant application 106A. The programmatically generated data may reflect a successful local authentication of the identity of user 101 by the executed application program (e.g., by executed mobile application 106A), and in some instances, merchant system 122 may generate the provision the authentication cryptogram in response to this successful local authentication.

Further, and as described herein, the authentication cryptogram may include a string of alphanumeric characters having a predetermined length (e.g., ten characters, fifteen characters, etc.), a predetermined composition (e.g., numerals from zero to nine, etc.), or a predetermined structure (e.g., a specified number of leading or training zeros, etc.), and may possess no extrinsic or exploitable value to malicious third parties operating within environment 100. As such, the authentication cryptogram, and its underlying alphanumeric character string, may be freely exchanged between network-connected devices and systems for purposes of authentication with minimal risk of exploitation by these malicious third parties, e.g., between client device 102 and call center system 140 or terminal device 104 across a potentially insecure voice communications channel. Further, examples of the authentication cryptogram may include, but are not limited to, a hash value exhibiting the predetermined length, composition, or structure, a digital token or a tokenized representation of a portion of the local cryptogram request, a cryptographic key, random or pseudo-random string of alphanumeric characters, or any additional or alternate cryptogram appropriate to client device 102, issuer system 130, or call center system 140, such any of the exemplary authentication cryptograms described herein.

Referring back to FIG. 3A, call center system 140 may also receive an authentication request that includes a local authentication cryptogram (e.g., in step 304). In some examples, call center system 140 may receive the authentication request a terminal device associated with call center system 140, e.g., terminal device 104. As described herein, terminal device 104 may receive the local authentication cryptogram from client device 102 across an insecure channel of communication, e.g., as spoken audio content captured by client device 102 and transmitted across an insecure voice communications channel established between client device 102 and terminal device 104. In some instances, the authentication request may be transmitted to call center system 140 in response to, or in support of, a merchant-specific inquiry awaiting resolution by the agent or operator of terminal device 104 (e.g., as provided to terminal device 104 by client device 102 using any of the processes described herein). Prior to provisional customer profile data to terminal device 104, which may facilitate a resolution of the merchant-specific inquiry, call center system 140 may perform any of the exemplary processes described herein to authenticate an identity of user 101 based on a comparison between the provisioned authentication cryptogram and the local authentication cryptogram included within the authentication request (e.g., in step 306).

For example, in step 306, call center system 140 may parse the received authorization request to extract the local authentication cryptogram, and may obtained the provisioned authentication credential from the one or more tangible, non-memories, e.g., from a portion of customer database 142. Call center system 140 may perform any of the exemplary processes described herein to authenticate an identity of user 101 based on a comparison between the provisioned authentication cryptogram 232 and the local authentication cryptogram, as extracted from the authentication request (e.g., also in step 306).

If call center system 140 were unable to establish a correspondence between the provisioned authentication cryptogram and the local authentication cryptogram (e.g., step 306; NO), call center system 140 may decline to authenticate the identity of user 101. Call center system 140 may generate an error message indicative of the unsuccessful authentication, which call center system 140 may transmit to terminal device 104 using any of the processes described herein (e.g., in step 308). Exemplary process 300 is then complete in step 310.

Alternatively, call center system 140 may determine that the provisioned authentication cryptogram corresponds to the local authentication cryptogram (e.g., step 306; YES), and call center system 140 may elect to authenticate the identity of user 101 based on the determined correspondence (e.g., in step 312). Based on the authenticated identity, call center system 140 may perform any of the exemplary processes described herein to access and obtain customer profile data corresponding to now-authenticated user 101 (e.g., in step 314), and to transmit (e.g., "provision") all or a portion of the obtained call center data to terminal device 104 (e.g., in step 316). For example, in step 316, call center system 140 may access one or more data records of customer database 142 that are associated with a unique identifier of user 101 (e.g., an alphanumeric user name or login credential assigned to user 101) or a unique identifier of client device 102 (e.g., an IP address or a MAC address), and extract a portion of the accessed data records corresponding to the customer profile data of user 101.

For example, the customer profile data may include, but is not limited, a name and address of user 101, values of demographic parameters characterizing user 101 (e.g., age, gender, occupation, etc.), rewards or loyalty programs in which user 101 participates, one or more merchant promotions available to user 101, a current status of a line of credit extended to user 101 by merchant 121, and data characterizing one or more payment instruments held by user 101 and specified to fund initiated payment transactions (e.g., tokenized data specifying one or more payment instruments held by user 101). Terminal device 104 may receive the provisioned customer profile data, and may perform any of the exemplary processes described herein to present portions of the customer profile data to user 105 through a corresponding interface, such as GUI 286 of FIG. 2B. Based on the presented portions of the customer profile data, user 105 may provide a response to the received merchant-specific inquiry over the established voice communications session, or may provide additional input to terminal device 104 requesting an initiation of additional operations by call center system 140 in accordance with the customer profile data. Exemplary process 300 is then complete in step 310.

III. Exemplary Computer-Implemented Processes for Authorizing Initiated Exchanges of Data in Real-Time Using Dynamically Generated Cryptographic Data In some embodiments, call center system 140 and terminal device 104 may perform operations that, individually or collectively, receive and respond to inquiries by provided by one or more customers of merchant 121, such as user 101. As described herein, terminal device 104 may receive data representative of a merchant-specific inquiry across a potentially insecure communications channel, such as audio data captured by client device 102.

The merchant-specific inquiry may include, among other things, a request by user 101 to initiate an exchange of data between call center system 140 and one or more additional network-connected computing systems operating within environment 100. In one example, the requested data exchange may be associated with, and may facilitate, an initiation and execution of a payment transaction involving a payment instrument held by user 101 and one or more financial services account held by or on behalf of merchant 121. The payment transaction may, among other things, satisfy an existing obligation of user 101 (e.g., a required payment on a line-of-credit extended to user 101 by merchant 121) or may facilitate a purchase of product or service offered for sale by user 101, and examples of the payment instrument may include, but are not limited to, a credit card account, a debit card account, a deposit account, or a line-of-credit issued by a corresponding financial institution, such as the financial institution associated with issuer system 130.

In some examples, described below in reference to FIGS. 4A-4C, 5A, 5B, 6A, and 6B, client device 102, issuer system 130, and call center system 140 may collectively perform operations that authenticate an identity of user 101, and that initiate and authorize the requested payment transaction, based on one or more authorization cryptograms dynamically generated by issuer system 130 and provisioned to client device 102. In some instances, issuer system 130 may generate the one or more authorization cryptograms either alone or in conjunction with one or more network-connected systems, such as tokenization system 160 of FIG. 1. Further, the one or authorization cryptograms may reflect a local authentication of user 101's identity by an application program executed by client device 102 and associated with issuer system 130, such as executed banking application 106B, and may also be indicative of the authorization of the payment transaction requested by user 101.

Certain of these exemplary processes, which authenticate the identity of user 101 and authorize requested exchanges of data based on dynamically generated authorization cryptograms having no extrinsic or exploitable meaning, may be implemented in addition to, or as an alternate to, the conventional authentication and authorization processes described above, which require the transmission of sensitive or confidential information across insecure communications channels. Further, certain of these exemplary processes, which replace the sensitive or confidential information with cryptograms having no relevance of malicious third parties, may also reduce occurrences of fraud and other malicious activity without modifications to an operation of call center system 140 or payment network 150.

Figure 4A:
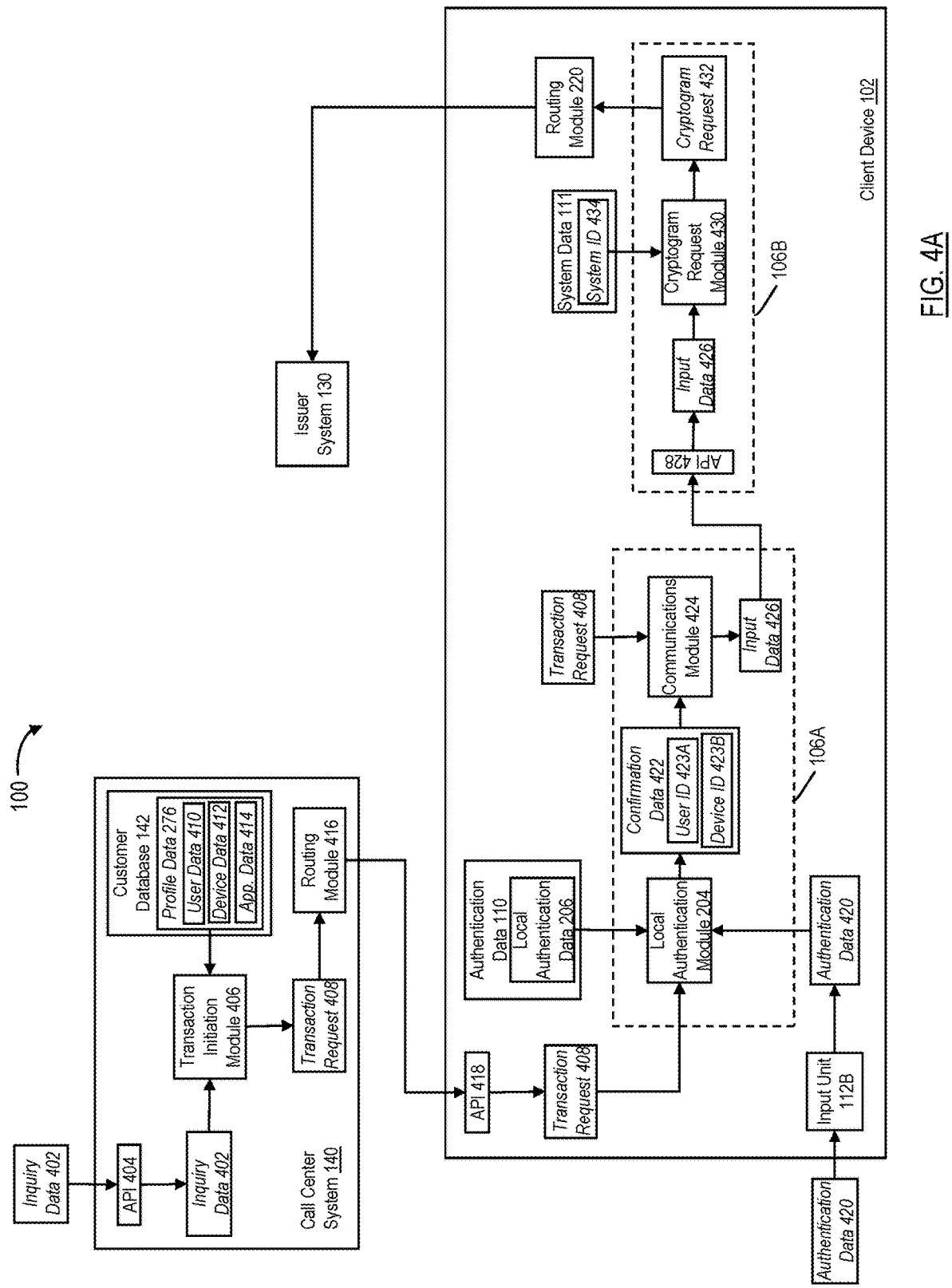
FIGS. 4A-4C, 5A, and 5B are diagrams illustrating portions of an exemplary computing environment, consistent with disclosed embodiments.

Referring to FIG. 4A, a programmatic interface established and maintained by call center system 140, such an API 404, may receive inquiry data 402, e.g., from terminal device 104 across direct communications channel 120A. As described herein, inquiry data 402 may characterize a merchant-specific inquiry received by an agent or employee of merchant call center 141 (e.g., user 105 of FIG. 1) across an established voice communication channel from client device 102, and may be generated by terminal device 104 based on input data provided by user 105, e.g., via a corresponding input device, such as a keyboard or a pressure-sensitive touchscreen display. For example, the merchant-specific inquiry may correspond to a request, by user 101, to initiate a payment transaction involving merchant 121, and inquiry data 402 may include a value of one or more parameters that characterize the requested payment transaction, such as a transaction date or a transaction value and information that identifies user 101 (e.g., any of the unique user identifiers described herein). In other examples, inquiry data 402 may optionally include information identifying a payment instrument selected by user 101 to fund the requested payment transaction, such as, but not limited to, a tokenized account (and/or routing number), an expiration date, or a verification code.

In some instances, API 404 may be associated with, and established or maintained by, a transaction initiation module 406 of call center system 140, and may facilitate direct, module-to-module communications between transaction initiation module 406 and one or more application modules executed by terminal device 104. API 404 may route inquiry data 402 to transaction initiation module 406, which may perform operations that package portions of inquiry data 402 into a transaction request 408 for transmission across network 120 to client device 102. For example, transaction request 408 may specify the parameter values that characterize the requested payment transaction, along with portions of the information that identifies user 101 and/or the information that identifies the selected payment instrument, as described herein. Further, in some instances, transaction initiation module 406 may also incorporate, into transaction request 408, information that identifies call center system 140 within environment 100, such as an IP address, a MAC address, or another unique network identifier of call center system 140.

Transaction initiation module 406 may also access the data records of customer database 142 to obtain customer profile data associated user 101, such as profile data 276. By way of example, profile data 276 may include, but is not limited to: (i) user data 410, which identifies and characterizes user 101; (ii) device data 412, which includes a unique network identifier of one or more network-connected devices associated with or operated by user 101, such as an IP address or a MAC address of client device 102; and/or (iii) application data 414, which identifies or characterizes one or more application programs executed by the network-connected devices, such as information identifying merchant application 106A or banking application 106B. In some instances, transaction initiation module 406 may extract portions of user data 410, device data 412, and/or application data 414 from profile data 276, and may incorporate the extracted portions into transaction request 408.

Further, although not illustrated in FIG. 4A, profile data 276 may also include information that characterizes a relationship between user 101 and merchant 121, such as, but not limited to, information characterizing a payment instrument available to fund payment transactions initiated by call center system 140. Examples of the payment-instrument information include, but are not limited to, an identifier of the payment instrument, a tokenized account and/or routing number, an expiration date, or an instrument-specific verification code. In some instances (e.g., when inquiry data 402 does not include or specify a selected payment instrument), transaction initiation module 406 may perform additional or alternate operations that extract portions of the payment-instrument information.

Transaction initiation module 406 may provide transaction request 408 as an input to a routing module 416, which may perform operations that cause call center system 140 to transmit transaction request 408 across network 120 to the unique network identifier of client device 102 (e.g., as included within transaction request 408). In some instances, and when received and processed by client device 102, one or more portions of transaction request 408 (such as, but not limited to, application data 414) may cause client device 102 to execute merchant application 106A automatically and without intervention from user 101.

For example, a programmatic interface established and maintained by client device 102, such API 418, may receive transaction request 408 from call center system 140. API 418 may, for example, be associated with executed merchant application 106A, and may facilitate secure, module-to-module communications between routing module 416 of call center system 140 and executed merchant application 106A. In some examples, API 418 may route transaction request 408 to local authentication module 204 of executed merchant application 106A, which may perform operations that store transaction request 408 in one or more tangible, non-transitory memories. Further, although not depicted in FIG. 4A, executed merchant application 106A may perform additional operations that cause client device 102 to generate and render for presentation one or more interface elements, e.g., via display unit 112A. In some instances, the presented interface elements may prompt user 101 to confirm the request payment transaction (e.g., as provided to user 105 of merchant call center 131) by providing one or more authentication credentials as an input to client device 102.

Referring back to FIG. 4A, input unit 112B of client device 102 may receive and route authentication data 420 to local authentication module 204 of executed merchant application 106A. For example, authentication data 420 may include, but is not limited to, an alpha-numeric user name or password assigned to user 101 by merchant system 122 or one or more biometric authentication credentials of user 101, such as fingerprint data or a digital image of a portion of user 101's face. Further, and using any of the exemplary local authentication processes described herein, local authentication module 204 may authenticate an identity of user 101 based on a comparison between portions of authentication data 420 and portions of local authentication credentials maintained by client device 102 within one or more tangible, non-transitory memories, such as local authentication data 206.

In response to a successful authentication of user 101's identity (e.g., based on a determination that the portions of authentication data 420 correspond to, or match, local authentication data 206), local authentication module 204 may generate confirmation data 422 that confirms the successful authentication of the identify of user 101, and provide confirmation data 422 as an input to a communications module 424 of executed merchant application 106A. In some examples, confirmation data 422 may include information that uniquely identifies user 101 (e.g., user identifier 423A, as maintained within local authentication data 206) or client device 102 (e.g., device identifier 423B as maintained within device data 109). In some instances, user identifier 423A may include a unique, alphanumeric identifier assigned to user 101 by issuer system 130 (e.g., a login credential that enables user 101 to access a digital portal associated with issuer system 130), device identifier 423B may include a network address, such as an IP address or a MAC address, that identifies client device 102 within environment 100.

Communications module 424 may receive confirmation data 422, and may perform operations that establish a secure, module-to-module handshake that facilitates data transmission from executed merchant application 106A and an additional application program executed by client device 102, such as banking application 106B associated with or provisioned by issuer system 130. In some examples, based on portions of transaction request 408 and confirmation data 422, executed banking application 106B may perform operations that generate a request for an authentication cryptogram associated with, and specific to, the requested payment transaction and that transmit the generated cryptogram request across network 120 to issuer system 130, as described below.

For example, communications module 424 may receive confirmation data 422 from local authentication module 204, and may load transaction request 408 from the one or more tangible non-transitory memories. Communications module 424 may perform operations that package portions of transaction request 408 and confirmation data 422 into input data 426, and upon execution of banking application 106B by client device 102, communications module 424 may route input data 426 to a programmatic interface established and maintained by executed banking application 106B, such as application programming interface (API) 428. As described herein, API 428 may facilitate the secure, module-to-module handshake between executed merchant application 106A and executed banking application 106B, and executed merchant application 106A may perform operation that provide input data 426 to executed banking application 106B (and in some instances, cause client device 102 to executed banking application 106B) automatically and without intervention from user 101.

Executed banking application 106B may, via API 428, receive input data 426 from communications module 424 of executed merchant application 106A, and API 428 may route input data 426 to a cryptogram request module 430 of executed banking application 106B. As described herein, input data 426 may include, among other things, the portions of transaction request 408 that specify and characterize the requested payment transaction and confirmation data 422, which confirms the successful local authentication of the identity of user 101. In some examples, cryptogram request module 430 may receive input data 426, and may package all or a portion of input data 426 into a cryptogram request 432. Cryptogram request module 430 may also load, from system data 111, a unique identifier 434 of a computing system associated with executed banking application 106B, such as a network address of issuer system 130, e.g., an IP address or a MAC address.

In one example, cryptogram request 432 may include the one or more parameter values that characterize the payment transaction requested by user 101, such as a transaction amount or a transaction date, along with user identifier 423A (e.g., which uniquely identifies user 101 to issuer system 130) and/or device identifier 423B (e.g., which uniquely identifies client device 102 within environment 100). In other examples, cryptogram request 432 may also include information characterizing the payment instrument available to fund payment transactions initiated by call center system 140, such as, but not limited to, an identifier of the payment instrument, a tokenized account and/or routing number, an expiration date, or an instrument-specific verification code. As described herein, the payment-instrument information may be incorporated within transaction request 408, or alternatively, executed banking application 106B may obtain the payment-instrument data based on input data (not illustrated in FIG. 4A) provided to client device 102 by user 101, e.g., via input unit 112B. For instance, the available payment instrument may be provisioned to a mobile wallet established by executed banking application 106B, and the input data may reflect user 101's selection of that available payment instrument to fund the requested payment transaction.

Referring back to FIG. 4A, cryptogram request module 430 may provide system identifier 434 and cryptogram request 432 as inputs to a routing module 220 of client device 102. In one example, system identifier 434 may be incorporated into a portion of cryptogram request 432, e.g., a header portion, although in other examples, system identifier 434 and cryptogram request 432 may be separate and distinct elements of data. Routing module 220 may receive system identifier 434 and cryptogram request 432 (e.g., as a single data element or as separate data elements). Based on system identifier 434, routing module 220 may perform operations that cause client device 102 to transmit cryptogram request 432 across network 120 to the network address of issuer system 130, e.g., using any appropriate communication protocols. In some examples, cryptogram request 432 may include information that instructs issuer system 130 to perform any of the exemplary processes described herein to generate an authentication cryptogram indicative of the successful local authentication of user 101's identity by executed merchant application 106A, to associate the authentication cryptogram with the parameter values or payment-instrument information that characterize the requested payment transaction, and to provision the generated authentication cryptogram to client device 102, as described below in reference to FIGS. 4B and 4C.

Figure 4B:
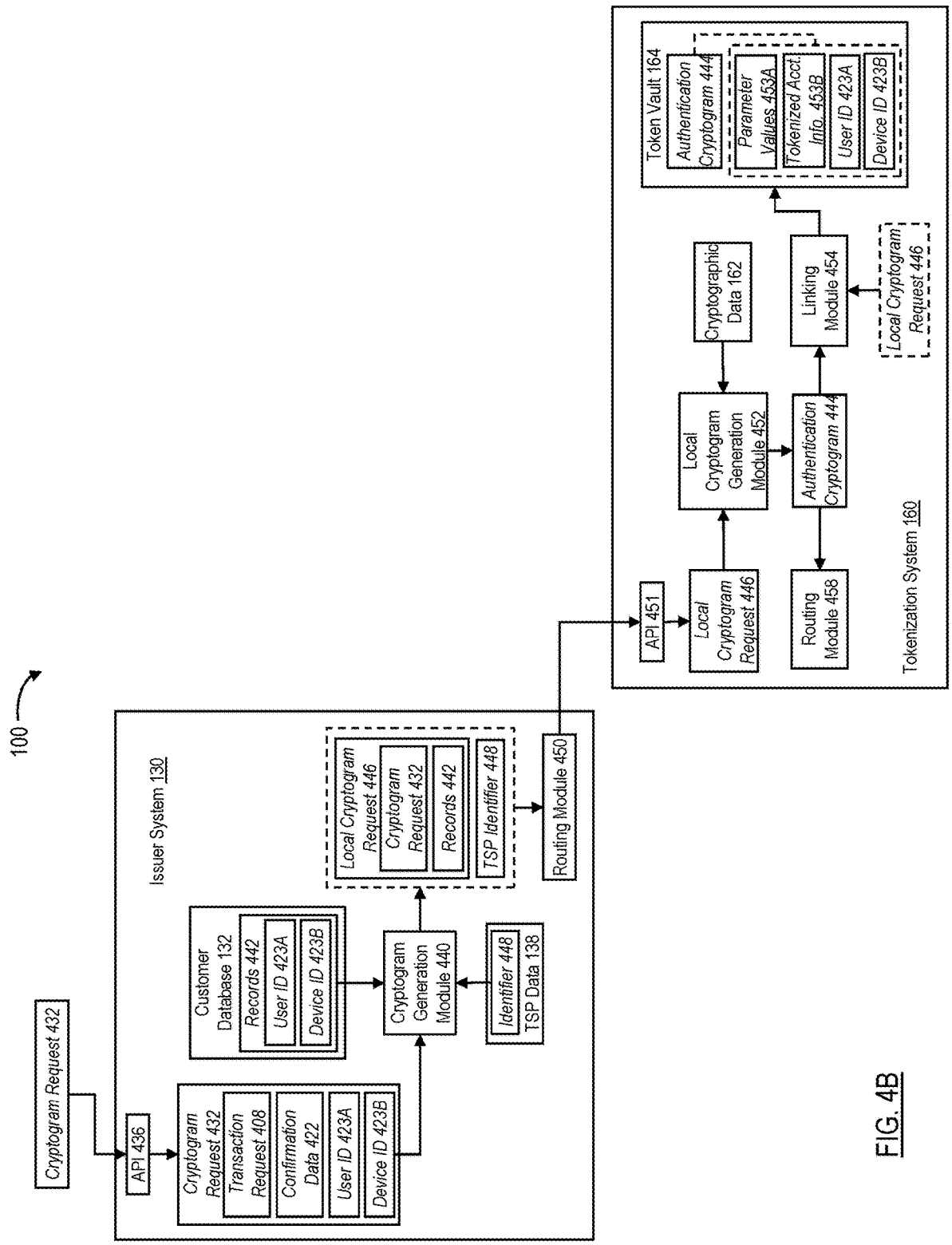

Referring to FIG. 4B, a programmatic interface established and maintained by merchant system 122, such as application programming interface (API) 436, may receive cryptogram request 432 from client device 102. By way of example, API 436 may be associated with, and established and maintained by, a cryptogram generation module 440 of issuer system 130, and may facilitate secure, module-to-module communications between cryptogram generation module 440 and routing module 220 of client device 102. Cryptogram generation module 440 may receive cryptogram request 432, which includes the portions of transaction request 408, confirmation data 422, user identifier 423A, and/or device identifier 423B, and may perform operations that extract, from customer account database 132, one or more customer data records 442 that include or reference user identifier 423A, and/or device identifier 423B. Examples of customer data records 442 include, but are not limited to, a name or address of user 101, information identifying one or more demographic characteristics of user 101 (e.g., an age, a gender, an educational level, etc., of user 101), or information characterizing a functionality of device 102 (e.g., a display functionality, etc.). The disclosed embodiments are, however, not limited to these examples of input data, and in other examples, customer data records 442 may include any additional or alternate information that characterizes user 101 or client device 102, and that would be appropriate to issuer system 130 (or to the financial institution that operates issuer system 130).

In some examples, issuer system 130 may perform operations that generate an authentication cryptogram 444 in conjunction with one or more network-connected computing systems operating within environment 100, such as a computing system associated with a tokenization service provider, e.g., tokenization system 160. Referring to FIG. 4B, cryptogram generation module 440 may package all or a portion of received cryptogram request 432 and extracted customer data records 442 into a local cryptogram request 446, and may extract a unique network identifier 448 of tokenization system 160 from one or more tangible, non-transitory memories, e.g., TSP data 138. Cryptogram generation module 440 may provide local cryptogram request 446 and network identifier 448 as inputs to a routing module 450 of issuer system 130, which may perform operations that cause issuer system 130 to transmit local cryptogram request 446 to tokenization system 160 using any appropriate communications protocol.

A programmatic interface established and maintained by tokenization system 160, e.g., application programming interface (API) 451 may receive and route local cryptogram request 446 to a local cryptogram generation module 452 of tokenization system 160. In some instances, API 451 may facilitate secure, module-to-module communications between routing module 450 of issuer system 130 and local cryptogram generation module 452. Local cryptogram generation module 452 may receive local cryptogram request 446, and may perform operations that store local cryptogram request 446, including the portions of cryptogram request 432 or customer data 442, within one or more tangible, non-transitory memories. Further, local cryptogram generation module 452 may also perform any of the exemplary processes described herein to generate authentication cryptogram 444 based on portions of local cryptogram request 446 (e.g., portions of cryptogram request 432 or customer data 442) and in accordance with certain elements of cryptographic information maintained within one or more tangible, non-transitory memories, e.g., cryptographic data 162.

As described herein, authentication cryptogram 444 may include a string of alphanumeric characters having a predetermined length (e.g., ten characters, fifteen characters, etc.), a predetermined composition (e.g., numerals from zero to nine, etc.), or a predetermined structure (e.g., a specified number of leading or training zeros, etc.), and may possess no extrinsic or exploitable value to malicious third parties operating within environment 100. As such, authentication cryptogram 444, and its underlying alphanumeric character string, may be freely exchanged between network-connected devices and systems for purposes of authentication with minimal risk of exploitation by these malicious third parties, e.g., between client device 102 and call center system 140 or terminal device 104 across a potentially insecure channel of voice communication. Further, examples of authentication cryptogram 440 may include, but are not limited to, a hash value exhibiting the predetermined length, composition, or structure, a digital token or a tokenized representation of a portion of received cryptogram request 432 or extracted customer data records 442, a cryptographic key, random or pseudo-random string of alphanumeric characters, or any additional or alternate cryptogram appropriate to client device 102, issuer system 130, or call center system 140, such any of the exemplary authentication cryptograms described herein.

In further examples, and as described herein, local cryptogram generation module 452 may access elements of cryptographic data 162 (e.g., as maintained by tokenization system 160 within one or more tangible, non-transitory memories), and may generate authentication cryptogram 444 in accordance with the accessed elements of cryptographic data 162. In some instances, cryptographic data 162 may specify the particular length, composition, or structure of the alphanumeric character string included within authentication cryptogram 244 and further, may specify a particular cryptogram-generation function, algorithm, or scheme that, when applied to the portions of cryptogram request 432 or customer data records 442 by local cryptogram generation module 452, generate authentication cryptogram 444 in accordance with the predetermined length, composition, or structure. Examples of the cryptogram-generation function, algorithm, or scheme include, but are not limited to, one or more of the hash functions described herein (e.g., a MD5 hash function, an SHA-1 or an SHA-2 hash function, etc.), one or more of the tokenization schemes described herein, one or more of the key-generation algorithms described herein, a random number generation algorithm, and/or a pseudo-random number generation algorithm.

In other examples, and as described herein, cryptographic data 162 may also specify that local cryptogram generation module 452 should apply the cryptogram-generation function, algorithm, or scheme to a specified portion of local cryptogram request 446, such as user identifier 423A, device identifier 423B, elements of transaction request 408, or elements of confirmation data 422 (e.g., as included within cryptogram request 432) and additionally or alternatively, to a specified portion of customer data records 442, such as a name of user 101, an address of user 101, or another element of customer-specific information. Cryptographic data 162 may specify multiple cryptogram-generation functions, algorithms, or schemes, and may include information that enables a selection of a corresponding one of these functional, algorithms, or schemes by local cryptogram generation module 452, as described herein (e.g., in reference to cryptographic data 126 of FIGS. 2A and 2B). The disclosed embodiments are, however, not limited to these exemplary elements of cryptographic data 162, and in other instances, cryptographic data 162 may include any additional or alternate information that supports the generation or provisioning of authentication cryptogram 444, including one or more previously generated authentication cryptograms and any of the supporting cryptographic data described herein.

In some instances, authentication cryptogram 444, as generated by local cryptogram generation module 452, may be valid for a single authentication operation, or may be valid for one or more authentication operations initiated during a corresponding temporal period of validity, such as, but not limited to, five, ten, or fifteen minutes after generation by local cryptogram generation module 452 or after provisioning to client device 102 by issuer system 130. In other instances, and consistent with certain of the disclosed exemplary embodiments, local cryptogram generation module 452 may impose no temporal limitations on newly generated authentication cryptogram 444, and authentication cryptogram 444 may be valid for and may facilitate authentication operation indefinitely upon generation and provisioning to network-connected devices and systems operating within environment 100.

Referring back to FIG. 4B, local cryptogram generation module 452 may provide authentication cryptogram 444 as an input to a linking module 454. Linking module 454 may access local cryptogram request 446, e.g., as maintained within the one or more transitory memories, and perform operations that store authentication cryptogram 444 and portions of local cryptogram request 446 within one or more portions of token vault 164. For example, linking module 454 may parse local cryptogram request 446 to extract the one or more parameter values that characterize the requested payment transaction (e.g., the transaction amount or the transaction date), tokenized information that characterizes the available payment instrument (e.g., the tokenized account data, the expiration date, verification code, etc.), user identifier 423A (e.g., the unique, alphanumeric login credential), and/or device identifier 423B (e.g., the IP or MAC address of client device 102). Linking module 454 may also access token vault 164, and store, within token vault 164, authentication cryptogram 444 in conjunction with certain ones of the extracted parameter values (e.g., as parameter values 453A), the tokenized payment-instrument information (e.g., as tokenized account information 453B), user identifier 423A, and/or device identifier 423B. In some instances, token vault 164 may associate authentication cryptogram 444 with not only parameter values 453A, tokenized account information 453B, user identifier 423A, and/or device identifier 423B, and also with actual account information associated with the available payment instrument, as maintained within token value 162 (e.g., an actual account number, expiration date, verification code, etc.).

Linking module 454 may also provide authentication cryptogram 444 as an input to a routing module 458 of tokenization system 160. In some instances, routing module 458 may access a unique network identifier of issuer system 130, such as an IP address or a MAC address, and may perform operations that cause tokenization system 160 to transmit authentication cryptogram 444 to issuer system 130, e.g., using any appropriate communications protocol. In other examples, not illustrated in FIG. 4B, cryptogram generation module 440 may perform any of the exemplary processes described herein (e.g., as performed by tokenization system 160) to locally generate an authentication cryptogram 444 based on portions of received cryptogram request 432 and extracted customer data 442 and in accordance with certain elements of cryptographic information maintained locally by issuer system 130 within one or more tangible, non-transitory memories, e.g., cryptographic data 134.

Figure 4C:
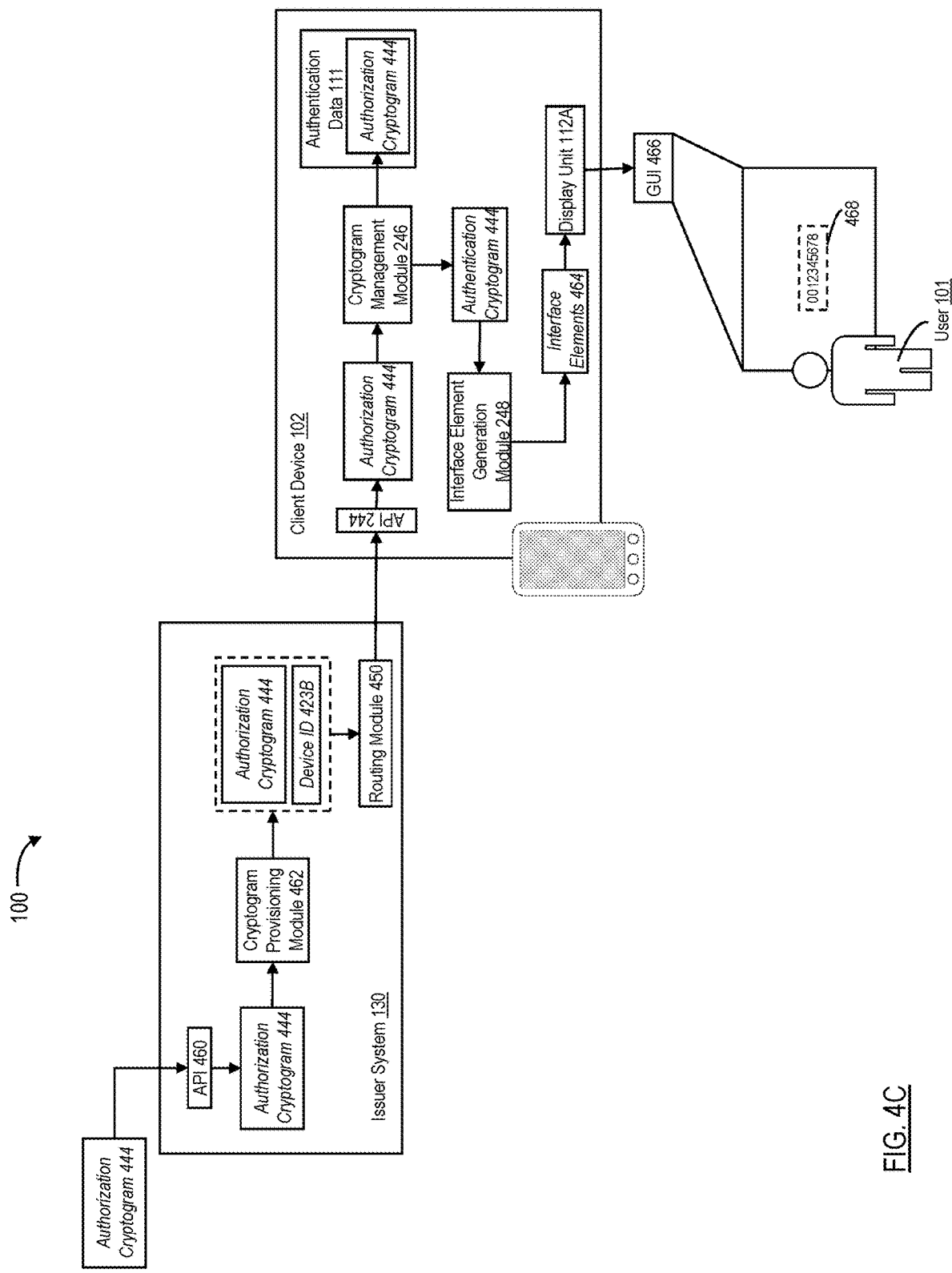

As described below in reference to FIG. 4C, issuer system 130 may perform any of the exemplary processes described herein to provision authentication cryptogram 444 to one or more network-connected devices operated by or associated with user 101, such as client device 102. Referring to FIG. 4C, a programmatic interface established or maintained by issuer system 130, such as application programming interface (API) 460, may receive authentication cryptogram 444 from tokenization system 160, and API 460 may route authentication cryptogram 444 to a cryptogram provisioning module 462 of issuer system 130. In some instances, API 460 may facilitate secure, module-to-module communications between cryptogram provisioning module 460 and routing module 458 of tokenization system 160. Further, cryptogram provisioning module 462 may receive authentication cryptogram 444, and may perform additional operations that access locally stored cryptogram request 432 and extract device identifier 423B, e.g., the IP or MAC address of client device 102. In some examples, cryptogram provisioning module 462 may provide device identifier 423B and authentication cryptogram 444 as inputs to routing module 450, which may perform operations that cause issuer system 130 to transmit authentication cryptogram 444 across network 120 to the unique network address of client device 102, e.g., using any appropriate communications protocol.

In some examples, API 244 of client device 102 may receive authentication cryptogram 444 from issuer system 130 and may route authentication cryptogram 444 to cryptogram management module 246, which performs operation that store authentication cryptogram within one or more tangible, non-transitory memories, such as within a portion of authentication data 110. Cryptogram management module 246 may also provide authentication cryptogram 444 as an input to interface element generation module 248, which generates one or more interface elements 464 representative of authentication cryptogram 444 and provides interface elements 464 to display unit 112A. In some examples, display unit 112A may render interface elements 464 for presentation to user 101 within a corresponding interface, such as graphical user interface (GUI) 466 generated by executed banking application 106B. In other examples, not illustrated in FIG. 4B, client device 102 may perform operations that generate an audible representation of authentication cryptogram 444 (e.g., based on an application of one or more text-to-speech (TTS) algorithms to the alphanumeric character string included within authentication cryptogram 444), and present that generated audible representation to user 101 through a corresponding hardware component, such as an embedded speaker or through headphones in communication with client device 102 through a wired or wireless connection.

For example, as illustrated in FIG. 4C, authentication cryptogram 444 may include a hash value (e.g., an alphanumeric character string 468, such as "0012345678"), which display unit 112A may display within GUI 466. As described herein, alphanumeric character string 268 may be characterized by a predetermined length (e.g., ten digits) and/or a predetermined composition (e.g., all numbers), and may exhibit a predetermined structure (e.g., two leading zeros).

Further, and as described herein, one or more of the predetermined length, composition or structure may be tailored to the presentation functionalities of client device 102 (e.g., a display functionality, such as a size or resolution of display unit 112A) and additionally or alternatively, may be established to facilitate a reliable and consistent verbal transmission of authentication cryptogram 444 across the established voice communication channel (e.g., issuer system 130 may establish the predetermined length of alphanumeric character string 468 to enable verbal transmission across the established voice communication channel within a reasonable amount of time).

In one example, and in response to the presentation of alphanumeric character string 468 within GUI 466, user 101 may recite alphanumeric character string 468 (e.g., the string "0012345678" presented on GUI 466), and a microphone embedded in or in communication with client device 102 (e.g., a portion of input unit 112B) may capture audio content representative of recited alphanumeric character string 468. In other examples, an application program executed by client device 102 (e.g., banking application 106B) may generate the audio content representative of alphanumeric character string 468 automatically and without input from user 101, e.g., based on an application of one or more text-to-speech (TTS) algorithms to alphanumeric character string 468.

Client device 102 may transmit the captured or generated audio content across the established voice communications channel to terminal device 104 using any appropriate telecommunications protocol, and terminal device 104 may receive, process, and present the captured audio content to user 105, e.g., via an embedded speaker or connected headphones. In some instances, user 105 may provide input data representative of the presented audio content (e.g., user 101's recitation of "0012345678") to terminal device 104 via a corresponding input unit. In other instances, one or more application programs executed by terminal device 104 may perform operations that detect a receipt of the captured or generated audio content, and that process the captured or generated audio content to generate the input data, e.g., automatically and without intervention from user 105 or other employees of merchant call center 141. By way of example, the one or more executed application programs may, collectively or individually, establish a virtual call-center agent or "bot" capable of interacting with user 101 across the established voice communications network.

The disclosed embodiments are, however, not limited to processes that capture or generate audio content representative of a recitation of alphanumeric character string 468 by user 101. In other examples, an application program executed by client device 102, e.g., executed merchant application 106A, may generate a signal representative of an entry of alphanumeric character string 468 into a telecommunications interface of client device 102, such as a Touch-Tone™ interface presented via display unit 112A, and transmit that generated signal across the established voice communications channel to terminal device 104. Client device 102 may generate the signal automatically and without intervention from user 101 (e.g., responsive to a receipt of authentication cryptogram 444), and one or more application programs executed by terminal device 104 may process the received signal and generate input data corresponding to alphanumeric character string 468 (and to authentication cryptogram 444).

In some examples, terminal device 104 may store the received or generated input data (e.g., which represents alphanumeric character string 468 and as such, authentication cryptogram 444) within one or more tangible, non-transitory memories, and transmit the received or generated input data to call center system 140 using an appropriate communications protocol, e.g., across direct communications channel 120A. As described below in reference to FIGS. 5A and 5B, call center system 140 may perform operations that package portions of the input data, along with a unique network identifier of call center system 140, into an authorization request corresponding to the payment transaction, which call center system 140 may transmit, across network 120, to a computing system associated with an appropriate payment network, such as payment network system 150. Payment network system 150 may route the authorization request to issuer system 130, which may perform operations that authorize, settle, and clear the requested payment transaction based on authentication cryptogram 444 and in accordance with one or more authorization, clearance, or settlement protocols, such as EMV-compatible payment protocols.

Figure 5A:
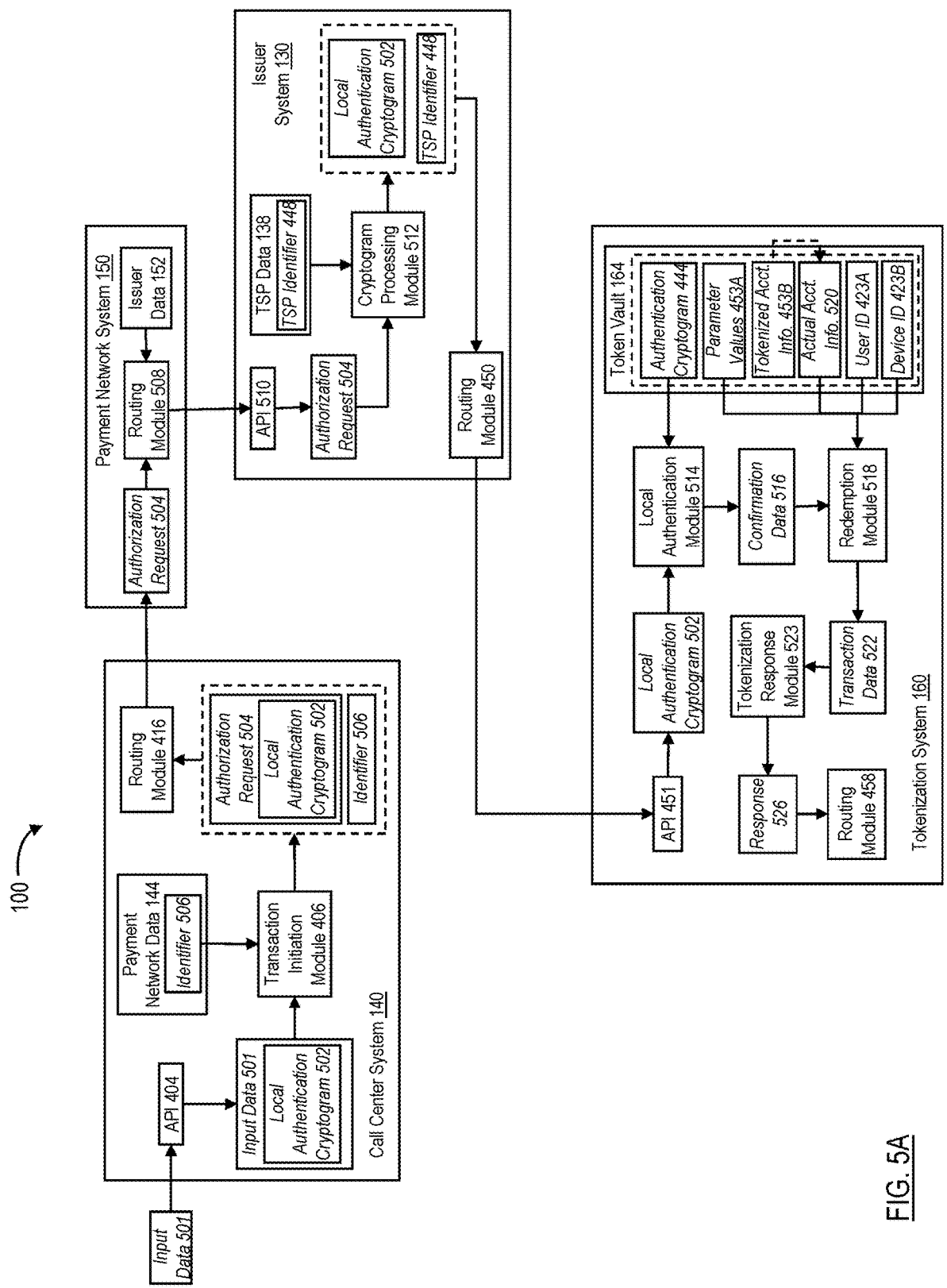

Referring to FIG. 5A, API 404 of call center system 140 may receive input data 501 from terminal device 104, e.g., across direct communications channel 120A. For example, input data 501 may be representative of, or include, a local authentication cryptogram 502, e.g., as provisioned to client device 102 by issuer system. Further, and as described herein, portions of local authentication cryptogram 502, including a corresponding alphanumeric character string, may be received by an agent or employee of merchant call center 141 (e.g., user 105 of FIG. 1) across an established voice communication channel from client device 102, and terminal device 104 may generate input data 501 based on input provided by user 105, e.g., via a corresponding input device, such as a keyboard or a pressure-sensitive touchscreen display.

API 404 may route input data 501 to transaction initiation module 406 of call center system 140, which may perform operations that package all or a portion of input data 404 (e.g., local authentication cryptogram 502, including the corresponding alphanumeric character string) into a request 504 for an authorization of the initiated payment transaction, as requested by user 101. Transaction initiation module 406 may perform additional operations that extract, from one or more tangible, non-transitory memories, a unique network identifier of call center system 140, such as an IP address or a MAC address, and packaged the unique network identifier into a portion of authorization request 504. Further, and in some examples, transaction initiation module 406 may also access payment network data 144, e.g., as maintained within one or more tangible, non-transitory memories, and extract a unique network identifier 506 of a network-connected computing system associated with a payment network facilitating an authorization, settlement, and clearance of the requested payment transaction, such as an IP address or a MAC address of payment network system 150. Transaction initiation module 406 may provide authorization request 504 and network identifier 506 as inputs to routing module 416, which may perform operations that cause call center system 140 to transmit authorization request 504 across network 120 to network address 506 of payment network system 150, e.g., using any appropriate communications protocols.

In some examples, a routing module 508 of payment network system 150 may receive authorization request 504 from call center system 140. Routing module 508 may access issuer data 152, and obtain a portion of the stored data identifying a network address of network-connected computing system capable of authorizing the requested payment transaction involving the selected payment instrument, such as issuer system 130. In some examples, routing module 508 may identify the network-connected computing system capable of authorizing the requested payment transaction involving the selected payment instrument, e.g., issuer system 130, based on one or more characteristics of authentication cryptogram 444, such as the length, composition, or structure. Routing module 508 may perform operations that cause payment network system 150 to transmit authorization request 504 across network 120 to the network address of the issuer system 140 through a corresponding programmatic interface, such as application programming interface 510 established or maintained by issuer system 130.

API 510 may receive authorization request 504, and route authorization request 504 to a cryptogram processing module 512 of issuer system 130. In some instances, API 510 may facilitate secure, module-to-module communications between cryptogram processing module 512 and routing module 508 of payment network system 150. As illustrated in FIG. 5A, cryptogram processing module 512 may store authorization request 504 within one or more tangible, non-transitory memories, and may parse authorization request 504 to extract local authentication cryptogram 502 (e.g., which may include the corresponding alphanumeric character string). Cryptogram processing module 512 may also extract unique network identifier 448 of tokenization system 160 from one or more tangible, non-transitory memories, e.g., TSP data 138. Cryptogram processing module 512 may provide local authentication cryptogram 502 and network identifier 448 as inputs to routing module 450, which may perform operations that cause issuer system 130 to transmit local authentication cryptogram 502 to tokenization system 160, e.g., using any appropriate communications protocol.

API 451 may receive and route local authentication cryptogram 502 to a local authentication module 514 of tokenization system 160. As described herein, API 451 may facilitate secure, module-to-module communications between local authentication module 514 and routing module 450 of issuer system 130. By way of example, and in response to a receipt of local authentication cryptogram 502, local authentication module 514 may access token vault 164 and may extract authentication cryptogram 444. In some instances, authentication cryptogram 444 may be indicative of a local authentication of an identity of user 101 by executed banking application 106B (e.g., by client device 102), and tokenization system 160 previously generated and stored authentication cryptogram 444 within token vault 164 using any of the exemplary processes described herein.

In some examples, local authentication module 514 may determine that authentication cryptogram 444 corresponds to local authentication cryptogram 502, and local authentication module 514 may elect to authenticate the identity of user 101 based on the determined correspondence. Local authentication module 514 may generate confirmation data 516 indicative of the successful authentication of the identity of user 101, and may provide confirmation data 516 as an input to a redemption module 518 of tokenization system 160. Redemption module 518 may receive confirmation data 516, and in response to the successful authentication, redemption module 518 may access token vault 164 and extract elements of stored transaction data linked to authentication cryptogram 444 (e.g., to "redeem" or decode local authentication cryptogram 502). For example, and as described above, token vault 164 may maintain parameter values 453A (e.g., parameter values that characterize the requested payment transaction, e.g., transaction amount and date) and tokenized account information 453B (e.g., a tokenized account number, expiration date, or verification code for the payment instrument selected to fund the requested payment transaction). Further, each of parameter values 453A and tokenized account information 453B may be linked to or associated with authentication cryptogram 444 within token vault 164.

Redemption module 518 may, in some instances, access tokenized account information 453B, and identify and extract actual account information 520 linked to tokenized account information 453B within token vault 164. Actual account information 520 may include actual, detokenized account information corresponding to the payment instrument selected to find the requested payment information, and examples of the actual, detokenized account information can include, but are not limited to, an actual account number, an actual expiration date, or an actual verification code assigned to the selected payment instrument. Redemption module 518 may also identify and extract parameter values 453A linked to authentication cryptogram 444 within token vault 164, and examples of parameter values 453A include, among other things, a transaction amount or a transaction date or time associated with the requested payment transaction. Redemption module 518 may also identify and extract linked user identifier 423A (and in some instances, device identifier 423B) from token vault 164.

In some examples, redemption module 518 may package actual account information 520, parameter values 453A, and user identifier 423A (and additionally, or alternatively, device identifier 423B) into transaction data 522, which redemption module 518 may provide as an input to a tokenization response module 524. Tokenization response module 524 may receive transaction data 522, and perform operations that package transaction data 522 into a response 526. In some instances, response 526 may also include information that uniquely identifies or characterizes tokenization system 160, such as a unique network identifier (e.g., an IP address, a MAC address, etc.) or a system-specific cryptogram that enables issuer system 130 to authenticate tokenization system 160.

Tokenization response module 524 may also extract, from one or more tangible, non-transitory memories, a unique network identifier of issuer system 130 (e.g., an IP address, a MAC address, etc.), and provide the extracted network identifier and response 526 as inputs to routing module 458 of tokenization system 160, which may perform operations that cause tokenization system 160 to transmit response 526 to issuer system 130 through one or more programmatic interfaces. As described below in reference to FIG. 5B, issuer system 130 may receive response 526, and may perform operations that, in conjunction with payment network system 150, authorize, clear, and settle the requested payment transaction in accordance with transaction data 522.

In other examples (not illustrated in FIG. 5A or 5B), local authentication module 514 may determine that authentication cryptogram 444 fails to correspond to local authentication cryptogram 502. Based on the determined lack of correspondence, local authentication module 514 may decline to authenticate the identity of user 101, and may generate an error message indicative of the unsuccessful authentication. Tokenization system 160 may forward the error message to issuer system 130 (e.g., using any of the processes described herein), and issuer system 140 may perform operations that route the error message to call center system 140 through payment network system 150 (not illustrated in FIG. 5A).

Figure 5B:
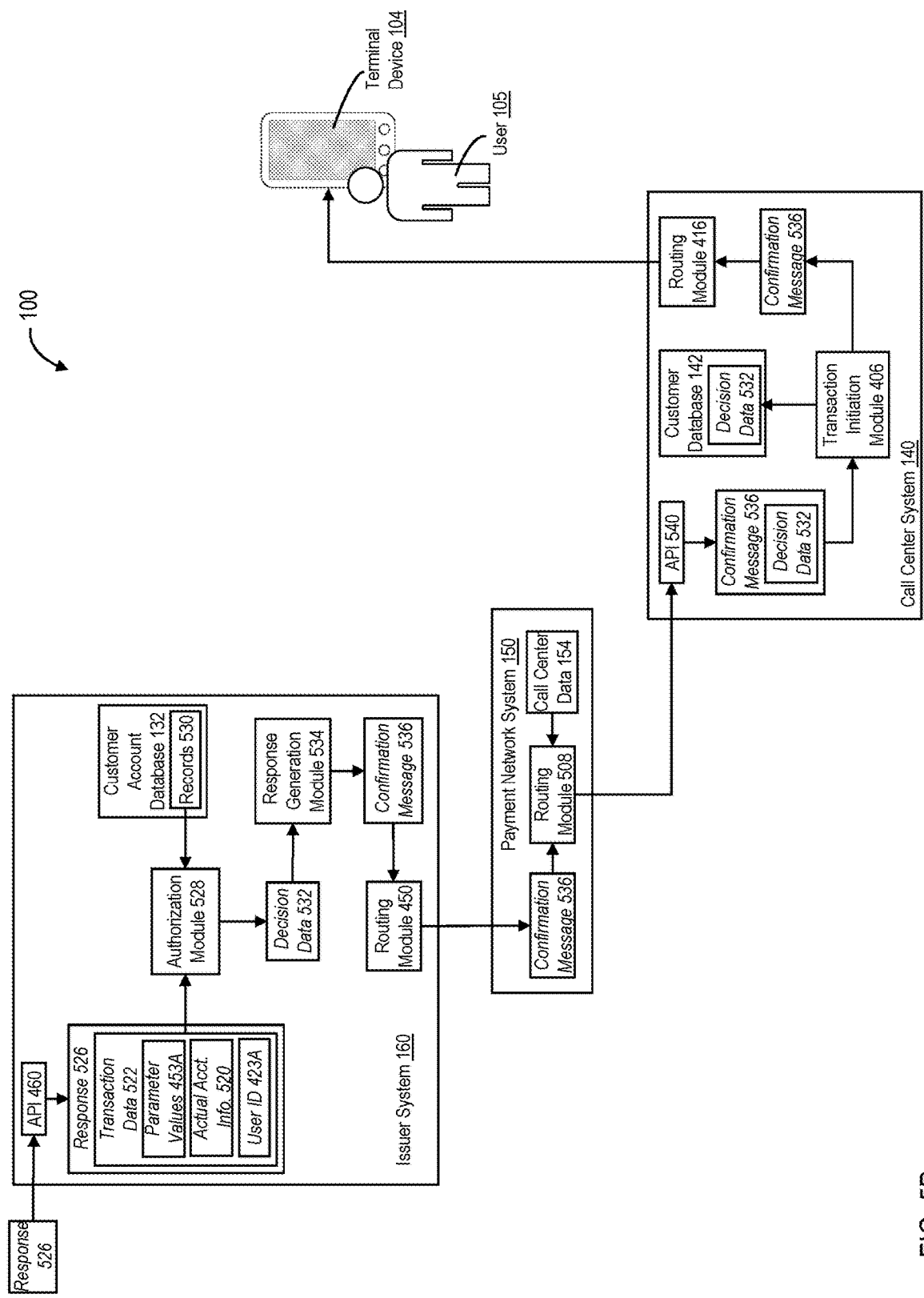

Referring to FIG. 5B, API 460 of issuer system 130 may receive and route response 526 to an authorization module 528 of issuer system 130. As described herein, API 460 may facilitate secure, module-to-module communication between transaction authorization module 528 and routing module 458 of tokenization system 160. In some instances, authorization module 528 may process response 526 to extract transaction data 522, which includes, but is not limited to, user identifier 423A associated with user 101 (e.g., the unique login credential assigned to user 101 by issuer system 130), parameter values 453A that characterize the requested payment transaction (e.g., a transaction value or a transaction date or time), and actual account information 520 that identifies the selected payment instrument (e.g., an actual account number, expiration date, or verification code, etc.). Further, authorization module 528 may also access stored data that characterizes a current account status of one or more payment instruments issued by the financial institution that maintains issuer system 160 (e.g., within customer account database 132), and load one or more data records 530 of customer account database 132 that characterize the current status of the selected payment instrument. Data records 530 may specify, among other things, a current account balance of the selected payment instrument, a credit limit established for the selected payment instrument, or a delinquency status of the selected payment instrument.

In some instances, authorization module 528 may determine whether to authorize the requested payment transaction involving the selected payment instrument based on portions of extracted transaction data 522 and data records 530 characterizing the current status of the selected payment instrument, and in accordance with the one or more payment or authorization protocols, such as an EMV payment protocol. Authorization module 528 may generate decision data 532 indicative of the decision to authorize, or alternatively, decline, the requested payment transaction using the selected payment instrument.

For example, an in response to a decision to authorize the requested payment transaction using the selected payment instrument, authorization module 528 may generate an authorization code, and package the generated authorization code and data that characterizes the authorized payment transaction (such as the authorized transaction value, the authorization date, the parties to the authorized transaction, etc.) into decision data 532. In other examples, and in response to a decision to the decline the requested payment transaction (e.g., when the transaction value would increase the account balance of the selected payment instrument above the credit limit, etc.), authorization module 528 may generate a code or other data indicative of the declined transaction, and incorporate the generated code or other data into decision data 532, along with additional or alternate data characterizing the declined transaction.

In some aspects, authorization module 528 may provide decision data 532 as an input to a response generation module 534. Response generation module 534 may perform operations that package all or a portion of decision data 532 into a confirmation message 536 indicative of the authorized or declined status of the requested payment transaction. Response generation module 534 may further provide confirmation message 536 an as input to a routing module 450, which perform operations that causes issuer system 130 to transmit confirmation message 536 across network 120 to payment network system 150. Routing module 508 of payment network system 150 may receive confirmation message 536, and may extract, from one or more tangible, non-transitory memories (e.g., from call center data 154 of FIG. 1), a unique network identifier of call center system 140. In some instances, routing module 508 may perform operations that cause payment network system 150 to transmit confirmation data 536 across network 120 to network identifier of call center system 140, e.g., through a corresponding programmatic interface.

A programmatic interface established or maintained by call center system 140, such as application programming interface (API) 540, may receive confirmation data 536 from issuer system 130, and may route confirmation data 536 to transaction initiation module 406 of call center system 140. Transaction initiation module 406 may perform operations that store conformation data 536, which includes decision data 532 indicative of an authorization of the requested payment transaction, within one or more tangible, non-transitory memories, e.g., within profile data 276 maintained within customer database 142. Transaction initiation module 406 may also provide confirmation data 536 as an input to routing module 416, which may perform operations that cause call center system 140 to transmit portions of confirmation data 536 to terminal device 104, e.g., across direct communications channel 120A. In some examples, terminal device 104 may perform any of the exemplary processes described herein to present indicative of the authorized or declined payment transaction to user 105, e.g., via an interface displayed on a corresponding display unit. Further, and through terminal device 104, user 105 may convey the information indicative of the authorized or declined payment transaction to user 101 using any of the exemplary processes described herein, e.g., through verbal communication across the voice communications session established between client device 102 and terminal device 104.

Figure 6A:
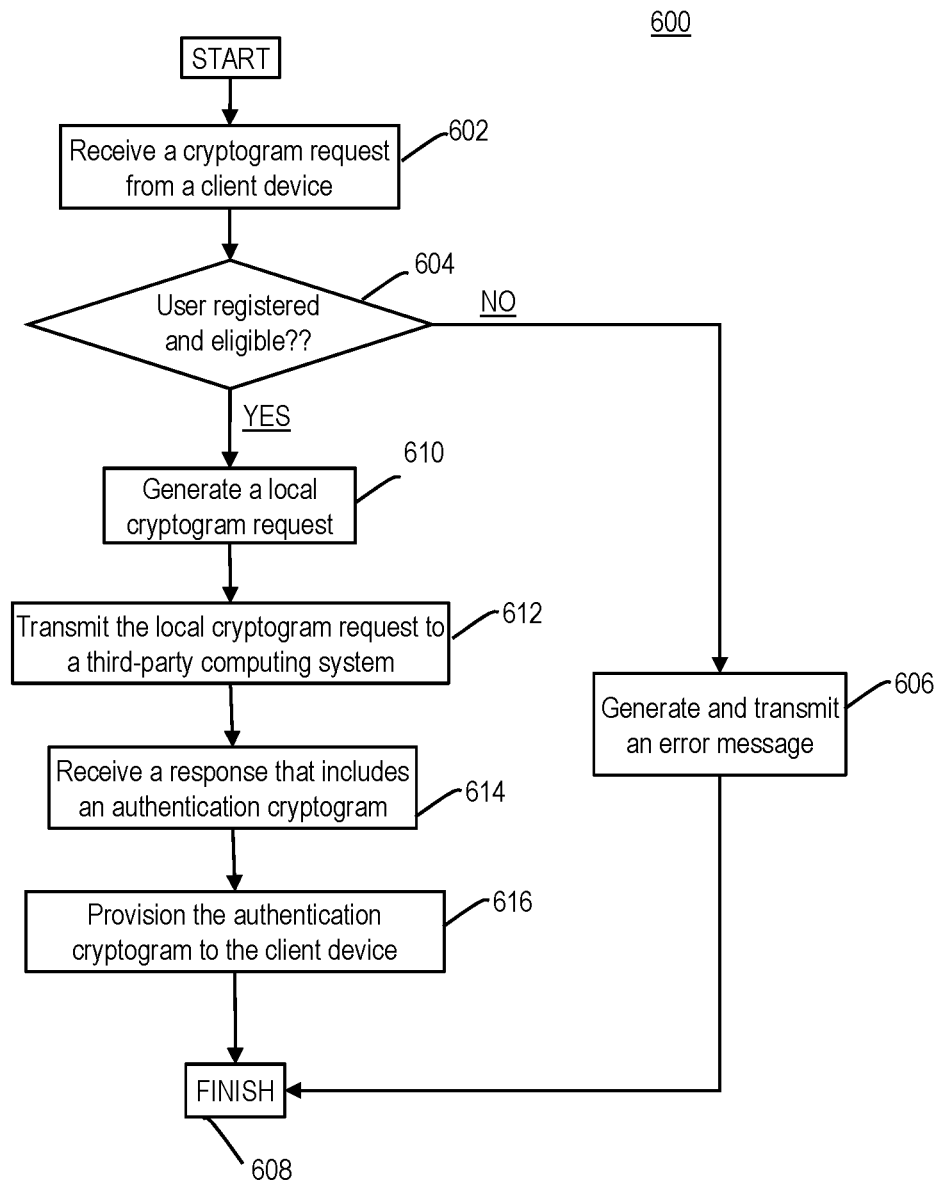
FIG. 6A is a flowchart of an exemplary process for dynamically generating and provisioning an authentication cryptogram to a network-connected device, in accordance with disclosed embodiments.

FIG. 6A is a flowchart of an exemplary process 600 for dynamically generating and provisioning an authentication cryptogram in response to programmatically generated request data, in accordance with certain disclosed embodiments. In some examples, issuer system 130 may perform the steps of exemplary process 600, which includes receiving a request to generate the authentication cryptogram from a network-connected device associated with the initiated data exchange, performing operations that generate the authentication cryptogram and associate the authentication cryptogram with parameter values and other data that characterizes the initiated data exchange, and provisioning the generated authentication cryptogram to the network-connected device. Further, and as described herein, the initiated data exchange may correspond to a payment transaction requested by an operator of the network-connected device (e.g., user 101, who operated client device 102) from network-connected call center system associated with a merchant (e.g., call center system 140 associated with merchant call center 141), and user 101 may provide information requesting and characterizing the payment transaction to an employee or agent call center 141 (e.g., user 105, who operates terminal device 104), across an insecure channel of communication.

Referring to FIG. 6A, issuer system 100 may receive a cryptogram request for an authentication cryptogram associated with an initiated data exchange from client device 102 (e.g., in step 602). In one instance, the initiated data exchange may be associated with a payment transaction requested by user 101, e.g., as part of a merchant-specific inquiry specified by user 101 and exchanged between client device 102 and terminal device 104 of call center system 140 across a potentially insecure voice communication channel, such as the voice communications channels described herein. Further, in some instance, an application program executed by client device 102, such as banking application 106B, may generate and transmit the cryptogram request automatically, and without intervention from user 101, in response to a receipt of a digital signal generated and transmitted to client device 102 by call center system 140.

In some examples, and as described herein, the received cryptogram request may be indicative of a local authentication of an identity of user 101 by client device 102 (e.g., based on operations performed by executed banking application 106B, or by executed merchant application 106A in communications with executed banking application 106B through a secure, module-to-module handshake, as described herein). Further, the received cryptogram request may also include information that identifies or characterizes the initiated data exchange. For example, and in addition to data confirming the successful local authentication of the identity of user 101, the received cryptogram request may also include values of one or more parameters that characterize the requested payment transaction (e.g., a transaction value, a transaction date or time, etc.), tokenized data characterizing a payment instrument available or selected to fund the requested payment transaction (e.g., a tokenized account number, expiration date, or verification code), and/or additional data that uniquely identifies user 101 (e.g., an alphanumeric login credential assigned to user 101 by issuer system 130) and/or client device 102 (e.g., an IP or MAC address assigned to client device 102).

Based on portions of the received cryptogram request, issuer system 130 may confirm a status of user 101 as a registered user of issuer system 130 and as such, an eligibility of user 101 to participate in the exemplary cryptogram-based authentication processes described herein (e.g., in step 604). For example, issuer system 130 may parse the received cryptogram to extract the unique identifier of user 101 or client device 102, and may query stored customer data, e.g., as maintained by issuer system 130 within customer account database 132 of FIG. 1, determine whether one or more structured or unstructured data records include the unique identifier of user 101 or client device 102. If the structured or unstructured data records of customer account database 132 fail to include either the unique identifier of user 101 or the unique identifier of client device 102 (e.g., step 604; NO), issuer system 130 may establish that user 101 is not a registered user of issuer system 130 and is ineligible to participate in the exemplary cryptogram-based authentication processes described herein. Issuer system 130 may perform operations that generate and transmit an error message across network 120 to client device 102 (e.g., in step 606), which may present portions of the transmitted error message on an interface generated by executed banking application 106B. Exemplary process 600 is them complete in step 608.

Alternatively, when the one or more of the unstructured data records of customer account database 132 include the unique identifier of user 101 or client device 102 (e.g., step 604; YES), issuer system 130 may determine that user 101 is a registered user of issuer system 130 and as such, is eligible participate in the exemplary cryptogram-based authentication processes described herein. Based on the determined eligibility, issuer system 130 may perform operations that, in conjunction with one or more network-connected computing systems, such as tokenization system 160 of FIG. 1, generate an authentication cryptogram that reflects the local authentication of user 101 by client device 102 (e.g., by executed merchant application 106A or executed banking application 106B) and facilitates an authorization of the initiated data exchange.

For example, issuer system 130 may package all or a portion of the received cryptogram request into a local cryptogram request for transmission to tokenization system 160 (e.g., in step 610). For example, the packaged portions of the received cryptogram request may include, but are not limited to, the values of one or more parameters that characterize the requested payment transaction (e.g., a transaction value, a transaction date or time, etc.), tokenized data characterizing the available or selected payment instrument (e.g., a tokenized account number, expiration date, or verification code), the unique user identifier (e.g., the alphanumeric login credential assigned to user 101 by issuer system 130), and/or the unique device identifier (e.g., an IP or MAC address assigned to client device 102).

Further, in step 610, issuer system may access customer database 142, and extract one or more data records that include or reference the unique user identifier or the unique device identifier. As described herein, the one or more extracted data records may include, but are not limited to, a name or address of user 101, information identifying one or more demographic characteristics of user 101 (e.g., an age, a gender, an educational level, etc., of user 101), or information characterizing a functionality of client device 102 (e.g., a display functionality, etc.). In some instances, issuer system 130 may perform additional operations that package the one or more extracted data records into a corresponding portion of the local cryptogram request (e.g., also in step 610).

In some examples, issuer system 130 may perform operations that generate and transmit, across network 120, a signal that includes the local cryptogram request to a third-party computing system, such as tokenization system 160 (e.g., in step 612). Although not illustrated in FIG. 6A, tokenization system 160 may receive the local authentication request, and based on portions of the local authentication request, perform any of the exemplary processes described herein to generate the requested authentication cryptogram, which reflects and confirm the local authentication of the identity of user 101. Tokenization system 160 may also store the generated authentication cryptogram within one or more tangible, non-transitory memories (e.g., token vault 164) along with additional linked information characterizing the requested payment transaction, user 101, or device 102. As described herein, the additional linked information may include, but is not limited to, the values of one or more parameters that characterize the requested payment transaction (e.g., a transaction value, a transaction date or time, etc.), tokenized data characterizing the available or selected payment instrument (e.g., a tokenized account number, expiration date, or verification code), the unique user identifier (e.g., the alphanumeric login credential assigned to user 101 by issuer system 130), and/or the unique device identifier (e.g., an IP or MAC address assigned to client device 102).

Tokenization system 160 may further perform any of the exemplary processes described herein to transmit a response to the local authentication request to issuer system 130. The transmitted response may, in some instances, include the authentication cryptogram, and issuer system 130 may receive the response to the local authentication request, including the authentication cryptogram, from tokenization system 160 (e.g., in step 614).

As described herein, the authentication cryptogram may include a string of alphanumeric characters having a predetermined length (e.g., ten characters, fifteen characters, etc.), a predetermined composition (e.g., numerals from zero to nine, etc.), or a predetermined structure (e.g., a specified number of leading or training zeros, etc.), and may possess no extrinsic or exploitable value to malicious third parties operating within environment 100. As such, authentication cryptogram 444, and its underlying alphanumeric character string, may be freely exchanged between network-connected devices and systems for purposes of authentication with minimal risk of exploitation by these malicious third parties, e.g., between client device 102 and call center system 140 or terminal device 104 across a potentially insecure channel of voice communication. Further, examples of the authentication cryptogram include, but are not limited to, a hash value exhibiting the predetermined length, composition, or structure, a digital token or a tokenized representation of a portion of the local cryptogram request, a cryptographic key, random or pseudo-random string of alphanumeric characters, or any additional or alternate cryptogram appropriate to client device 102, issuer system 130, or call center system 140, such any of the exemplary authentication cryptograms described herein.

Referring back to FIG. 6A, issuer system 130 may perform any of the exemplary processes described herein to provision the authentication cryptogram to client device 102 (e.g., in step 616). As described herein, client device 102 may perform any of the exemplary processes described herein to store the authentication cryptogram within one or more tangible, non-transitory memories, and to present information indicative of the authentication cryptogram, and the alphanumeric character string included within the authentication cryptogram, to user 101, e.g., within a corresponding graphical user interface (e.g., GUI 466 of FIG. 4B). Exemplary process 600 is then complete in step 610.

In response to the presentation of the authentication cryptogram within the corresponding graphical user interface, client device 102 may capture or generate audio content representative of the presented authentication cryptogram (e.g., based a captured utterance of the alphanumeric character string included within the authentication cryptogram by user 101, or based an audio representation of the authentication cryptogram generated by one or more application programs executed by client device 102). Client device 102 may transmit the captured or generated audio content to terminal device 104, e.g., across the insecure voice communications channel described herein, and terminal device 104 may perform any of the exemplary processes described herein to capture or generate input data indicative of authentication credential represented by the audio content. In some examples, and as described herein, terminal device 104 may provide the input data, which includes the representation of the authentication cryptogram, to call center system 140, and call center system 140 may perform any of the exemplary processes described herein to generate an authorization request that includes all, or a portion, of the provided input data (e.g., the authentication cryptogram), and to route the authorization request to issuer system 130 via one or more intermediate network-connected systems, such as payment network system 150. As described below in reference to FIG. 6B, issuer system 130 may perform operations that authenticate the identity of user 101 and further, that authorize the requested payment transaction, based on the authentication cryptogram included within the authorization request.

Figure 6B:
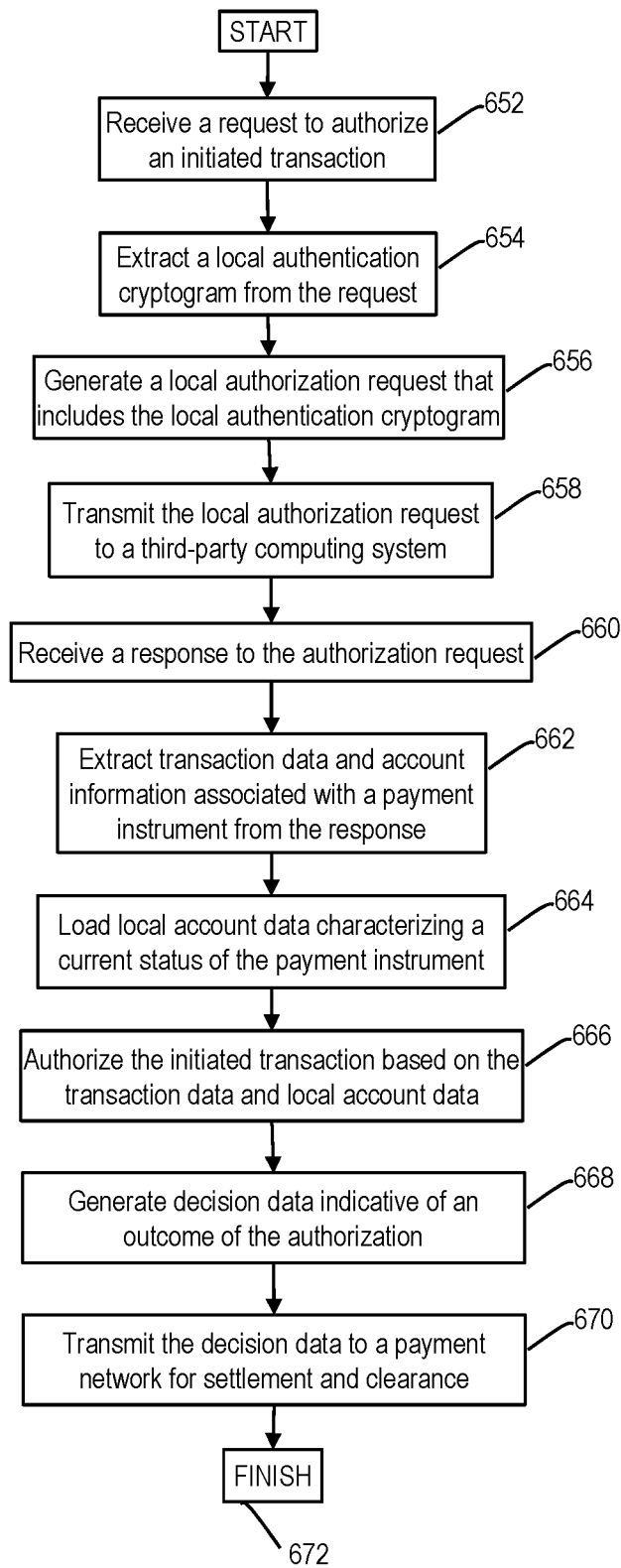
FIG. 6B is a flowchart of an exemplary process for authorizing an initiated data exchange based on cryptographic data generated and provisioned dynamically to network-connected devices and systems, in accordance with disclosed embodiments.

FIG. 6B is a flowchart of an exemplary processes 650 for authorizing and initiate exchanges of data, in real-time, based on cryptographic data generated dynamically and provisioned to network-connected devices and systems, in accordance with the disclosed exemplary embodiments. In some examples, issuer system 130 may perform the steps of exemplary process 650, which includes, among other things, receiving an authorization request that includes a local authentication cryptogram, authenticating the identity of user 101 based on a determined corresponding between the local authentication cryptogram and a previously provisioned authentication cryptogram, authorizing the requested payment transaction in accordance with transaction data associated with the previously provisioned authentication cryptogram. Further, and as described herein, the initiated data exchange may correspond to a payment transaction requested by an operator of the network-connected device (e.g., user 101, who operated client device 102) from network-connected call center system associated with a merchant (e.g., call center system 140 associated with merchant call center 141).

Referring to FIG. 6B, issuer system 130 may receive a request to authorize the initiated payment transaction from call center system 140 (e.g., in step 652). In some examples, payment network system 150 may route the authorization request from call center system 140 to issuer system 130, and the authorization request may include a local authentication cryptogram, e.g., based on audio content captured or generated by client device 102 and transmitted to terminal device 104, as described herein. Issuer system 130 may perform operations that extract the local authentication cryptogram from the received authorization request (e.g., in step 654), and that generate a local authentication request that includes the now-extracted local authentication cryptogram (e.g., in step 656). In some examples, issuer system 130 may perform operations that generate and transmit, across network 120, a signal that includes the local authentication request to a third-party computing system, such as tokenization system 160 (e.g., in step 658).

Although not illustrated in FIG. 6B, tokenization system 160 may receive the local authentication request, and based on portions of the local authentication request, perform any of the exemplary processes described herein to authenticate an identity of user 101 based on comparison between the local authentication cryptogram, as included within the local authentication request, and a previously generated authentication cryptogram maintained within one or more tangible, non-transitory memories, e.g., within token vault 164. In response to a successful authorization of the identity of user 101, tokenization system 160 may further extract, from the one or more tangible non-transitory memories (e.g., from token vault 164), certain elements of transaction data that are linked to the stored authentication cryptogram and that characterize the requested payment transaction.

Examples of these elements of transaction data include, but are not limited to, parameter values that characterize the requested payment transaction, such as transaction value or a transaction date, and detokenized account information that characterizes the payment instrument available or selected to fund the requested payment transaction, such as an actual account number, an actual expiration date, or an actual verification code assigned to the selected payment instrument. In other instances, tokenization system 160 may also extract, from token vault 164, a unique user identifier of user 101 (e.g., an alphanumeric login credential assigned to user 101 by issuer system 130) or a unique device identifier of client device 102 (e.g., an IP address or a MAC address assigned to client device 102), each of which may be associated with or linked to the stored authentication cryptograms. In some instances, tokenization system 160 may perform any of the processes described herein to package portions of the extracted transaction data (e.g., the parameter values and the actual account information), along with the unique user identifier and/or the unique device identifier, into an authentication response, which tokenization system may transmit to issuer system 130.

Referring back to FIG. 6B, issuer system 140 may receive the authentication response from tokenization system 160 (e.g., in step 660), and may perform operations that extract portions of the transaction data, the unique user identifier, and/or the unique device identifier from the received authentication response (e.g., in step 662). Further, issuer system 130 may also access stored data that characterizes a current account status of one or more payment instruments issued by the financial institution that maintains issuer system, e.g., within customer account database 132, and load one or more data records that characterize the current status of the available or selected payment instrument (e.g., in step 664).

Based on portions of the extracted transaction data and the loaded data records, issuer system 130 may perform any of the exemplary processes described herein to determine whether to authorize the requested payment transaction involving the available or selected payment instrument (e.g., in step 666), and to generate decision data indicative of the determination to authorize or decline the requested payment transaction (e.g., in step 668). Issuer system 130 may also perform any of the exemplary processes described herein to transmit the generated decision data, e.g., within a corresponding confirmation message, across network 120 to call center system 140 through one or more intermediary network-connected systems, such as payment network system 150, and through one or more programmatic interfaces (e.g., in step 670). As described herein, call center system 140 may receive the confirmation message, which includes the generated decision data, and provide portions of the confirmation message to terminal device 104, which may present information indicative of the authorized or declined payment transaction to user 105, e.g., via an interface displayed on a corresponding display unit. Exemplary process 650 is them complete in step 672.

IV. Exemplary Computing Environments

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including merchant application 160A, banking application 160B, local authentication module 204, cryptogram request module 210, routing module 220, API 222, cryptogram generation module 228, cryptogram provisioning module 234, routing module 238, cryptogram management module 242, API 244, cryptogram management module 246, interface element generation module 248, data management module 266, authentication module 270, provisioning module 274, routing module 278, interface element generation module 282, API 404, transaction initiation module 406, routing module 416, communications module 424, cryptogram request module 430, cryptogram generation module 440, routing module 450, API 451, local cryptogram generation module 452, linking module 454, routing module 458, cryptogram provisioning module 462, routing module 508, API 510, cryptogram processing module 512, local authentication module 513, redemption module 518, tokenization response module 523, authorization module 528, and response generation module 534, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

Although the apparatuses, systems, and methods have been described in terms of exemplary embodiments, they are not limited thereto. Rather, the appended claims should be construed broadly, to include other variants and embodiments of the apparatuses, systems, and methods, which may be made by those skilled in the art without departing from the scope and range of equivalents of the systems and methods.

What is claimed is:

1. An apparatus, comprising:
a communications unit;
a storage unit storing instructions; and
at least one processor coupled to the communications unit and the storage unit, the at least one processor being configured to execute the instructions to:
receive a first cryptogram associated with a first device from a second device via the communications unit, and load a second cryptogram from the storage unit, the second device being configured to receive at least a portion of the first cryptogram from the first device, the second cryptogram being generated by a computing system associated with an application program executed by the first device, and the second cryptogram being indicative of a prior authentication of an identity of the first device by the executed application program;
authenticate the identity of the first device based on a comparison of the first and second cryptograms; and
based on the authenticated identity of the first device, perform operations consistent with profile data associated with the first device.

2. The apparatus of claim 1, wherein at least one of the first cryptogram or the second cryptogram comprises at least one of a hash value, a digital token, a cryptographic key, a random number, or a pseudo-random number.

3. The apparatus of claim 1, wherein the second device is configured to receive the first cryptogram from the first device across a communications channel.

4. The apparatus of claim 3, wherein the communications channel comprises a voice communications channel.

5. The apparatus of claim 3, wherein the at least one processor is further configured to execute the instructions to:
receive the second cryptogram and a device identifier of the first device from the computing system via the communications unit; and
store the second cryptogram within a first portion of the storage unit, and store the device identifier within a second portion of the storage unit.

6. The apparatus of claim 5, wherein the at least one processor is further configured to execute the instructions to:
access the device identifier within the second portion of the storage unit; and
load the profile data from the storage unit based on the device identifier.

7. The apparatus of claim 1, wherein:
the first cryptogram comprises a first alphanumeric character string and the second cryptogram comprises a second alphanumeric character string; and
the at least one processor is further configured to execute the instructions to authenticate the identity of the first device based on a comparison of the first and second alphanumeric character strings.

8. The apparatus of claim 1, wherein the at least one processor is further configured to execute the instructions to:
receive, via the communications unit, inquiry data from the first device, the inquiry data comprising a value of a query parameter;
determine that a portion of the profile data is consistent with the query parameter value; and
transmit, via the communications unit, the portion of the profile data to the first device.

9. The apparatus of claim 1, wherein:
the first device is operable by a user;
the identity of the first device comprises a user identity;
the second cryptogram comprises an authentication token; and
the first cryptogram is indicative of a local authentication, by the executed application program, of the user identity.

10. The apparatus of claim 1, wherein the first device comprises a client device, and the second device comprises a terminal device.

11. A computer-implemented method, the method comprising:
using at least one processor, receiving a first cryptogram associated with a first device from a second device, and loading a second cryptogram from a data repository, the second device being configured to receive at least a portion of the first cryptogram from the first device, the second cryptogram being generated by a computing system associated with an application program executed by the first device, and the second cryptogram being indicative of a prior authentication of an identity of the first device by the executed application program;

authenticating, using the at least one processor, the identity of the first device based on a comparison of the first cryptogram and second cryptograms; and based on the authenticated identity of the first device, performing, using the at least one processor, operations consistent with profile data associated with the first device.

12. The computer-implemented method of claim 11, wherein at least one of the first cryptogram or the second cryptogram comprises at least one of a hash value, a digital token, a cryptographic key, a random number, or a pseudo-random number.

13. The computer-implemented method of claim 11, wherein the second device is configured to receive the first cryptogram from the first device across a corresponding communications channel.

14. An apparatus, comprising:
a communications unit;
a storage unit storing instructions; and
at least one processor coupled to the communications unit and the storage unit, the at least one processor being configured to execute the instructions to:
receive, via the communications unit, a first cryptogram associated with an exchange of data initiated at a first device from a second device, the second device being configured to receive at least a portion of the first cryptogram from the first device;
transmit the first cryptogram to a computing system via the communications unit, the computing system being associated with an application program executed by the first device, the computing system being configured to perform operations that authorize the initiated data exchange based on a comparison of the first cryptogram and a second cryptogram, and the second cryptogram being indicative of a prior authentication of an identity of the first device by the executed application program; and
receive, via the communications unit, data indicative of the authorization of the initiated data exchange, and based on the data, perform operations consistent with the authorized data exchange.

15. The apparatus of claim 14, wherein the computing system is further configured to generate the first cryptogram.

16. The apparatus of claim 14, wherein at least one of the first cryptogram or the second cryptogram comprises at least one of a hash value, a digital token, a cryptographic key, a random number, or a pseudo-random number.

17. The apparatus of claim 14, wherein the second device is configured to receive the first cryptogram from the first device across a communications channel.

18. The apparatus of claim 17, wherein the communications channel comprises a voice communications channel.

19. The apparatus of claim 14, wherein the computing system is further configured to perform operations that authenticate the identity of the first device based on the comparison between the first and second cryptograms, and that authorize the initiated data exchange based on the authenticated identity.

20. The apparatus of claim 14, wherein the at least one processor is further configured to execute the instructions to:
generate confirmation data indicative of the authenticated identity; and
transmit at least a portion of the confirmation data to the second device via the communications unit, the second device being configured to present a graphical representation of the portion of the confirmation data within a digital interface.

21. The apparatus of claim 14, wherein:
the first device is operable by a user, and the identity of the first device comprises a user identity;
the data exchange comprises a payment transaction;
the second cryptogram comprises an authentication token; and
the first cryptogram is indicative of a local authentication, by the executed application program, of the user identity.

* * * * *